(12) United States Patent
Cichy et al.

(10) Patent No.: US 8,757,519 B2
(45) Date of Patent: Jun. 24, 2014

(54) CARTRIDGE SPREADER SYSTEM

(75) Inventors: Steven J Cichy, Marysville, OH (US);
Paul M Havlovitz, Plain City, OH (US);
Mark A Ochs, Urbana, OH (US); Brad Schultz, Powell, OH (US); Jeffrey Kalman, Cleveland Heights, OH (US);
Craig Saunders, Rocky River, OH (US);
Paul Stephens, Twinsburg, OH (US);
Bill Rabbitt, Solon, OH (US); June O Toscano, Westerville, OH (US)

(73) Assignee: OMS Investments, Inc., Los Angeles, CA (US)

( * ) Notice: Subject to any disclaimer, the term of this patent is extended or adjusted under 35 U.S.C. 154(b) by 165 days.

(21) Appl. No.: 12/939,592

(22) Filed: Nov. 4, 2010

(65) Prior Publication Data
US 2011/0042493 A1 Feb. 24, 2011

Related U.S. Application Data

(62) Division of application No. 12/347,752, filed on Dec. 31, 2008.

(60) Provisional application No. 61/051,867, filed on May 9, 2008, provisional application No. 61/116,967, filed on Nov. 21, 2008, provisional application No. 61/122,953, filed on Dec. 16, 2008.

(51) Int. Cl.
*A01C 17/00* (2006.01)

(52) U.S. Cl.
USPC ............................................ 239/681; 239/676

(58) Field of Classification Search
CPC .................................. B05B 7/14; B05B 1/326
USPC ......... 239/681, 650, 658, 659, 668, 672, 676, 239/684, 685, 671
See application file for complete search history.

(56) References Cited

U.S. PATENT DOCUMENTS

| 1,022,062 A | 4/1912 | Christopher |
| 1,166,477 A | 1/1916 | Parrish |

(Continued)

FOREIGN PATENT DOCUMENTS

WO   WO 2006/078324   7/2006

OTHER PUBLICATIONS

International Search Report and Written Opinion of the International Searching Authority for PCT/US09/33392, mailed Mar. 26, 2009, 11 pages.

(Continued)

*Primary Examiner* — Davis Hwu
(74) *Attorney, Agent, or Firm* — Hunton & Williams LLP

(57) ABSTRACT

The cartridge spreader system includes a mobile cartridge spreader with a cartridge station configured to engage a cartridge and includes a locking controller for locking the cartridge securely into the cartridge station. The cartridge station includes an activator mechanism for activating and deactivating an engaged cartridge. The cartridge spreader includes an activation controller for activating and deactivating the cartridge. Activation of the cartridge allows the granular product contained in the cartridge to flow out of the container, through a granular chute on the cartridge station, and onto a granular product launcher which launches or impels the granular product over terrain or other surface. When the cartridge is deactivated, the flow path is sealed stopping the flow of granular product. The cartridge itself includes a fitment that engages with the cartridge station. The cartridge fitment includes an appropriately sized metering gate.

18 Claims, 40 Drawing Sheets

(56) References Cited

U.S. PATENT DOCUMENTS

| | | | |
|---|---|---|---|
| 2,451,128 A | 10/1948 | Thiesse | |
| 2,586,492 A | 2/1952 | Ulrich | |
| 2,761,589 A | 9/1956 | Stach | |
| 2,817,460 A | 12/1957 | Bond | |
| 2,832,509 A | 4/1958 | Emanatian | |
| 3,080,098 A | 3/1963 | Fierman | |
| 3,081,004 A | 3/1963 | Laughlin et al. | |
| 3,107,822 A | 10/1963 | Regenstein, Jr. | |
| 3,113,702 A | 12/1963 | Luedtke | |
| 3,152,732 A | 10/1964 | Schulman et al. | |
| 3,216,620 A | 11/1965 | Laughlin | |
| 3,276,162 A | 10/1966 | Chester | |
| 3,383,055 A | 5/1968 | Speicher | |
| 3,406,915 A | 10/1968 | Dreyer | |
| 3,738,546 A | 6/1973 | Speicher | |
| 3,856,211 A | 12/1974 | Williams | |
| 3,972,387 A | 8/1976 | Braun | |
| 4,062,496 A | 12/1977 | Melton | |
| 4,121,733 A | 10/1978 | McRoskey et al. | |
| 4,180,184 A | 12/1979 | Florer et al. | |
| 4,185,782 A | 1/1980 | Belrose | |
| 4,386,719 A * | 6/1983 | Serizawa | 222/242 |
| 4,483,486 A | 11/1984 | Magda | |
| 4,487,370 A | 12/1984 | Speicher | |
| 4,541,765 A | 9/1985 | Moore | |
| 4,588,133 A | 5/1986 | Brabb et al. | |
| 4,597,531 A | 7/1986 | Kise | |
| 4,635,818 A | 1/1987 | Glass | |
| 4,671,434 A | 6/1987 | Johnston et al. | |
| 4,798,325 A * | 1/1989 | Block | 239/663 |
| 4,867,381 A | 9/1989 | Speicher | |
| 4,949,906 A | 8/1990 | Godwin | |
| 4,962,781 A | 10/1990 | Kanbar | |
| 5,009,344 A | 4/1991 | Cooley | |
| 5,046,664 A | 9/1991 | van der Lely et al. | |
| 5,054,693 A | 10/1991 | Chow | |
| 5,119,993 A | 6/1992 | Gunzel, Jr. et al. | |
| 5,123,598 A | 6/1992 | Courtney et al. | |
| 5,288,017 A | 2/1994 | Havlovitz | |
| 5,294,060 A | 3/1994 | Thompson | |
| 5,340,033 A * | 8/1994 | Whitell | 239/676 |
| 5,489,023 A | 2/1996 | Havlovitz | |
| D373,367 S | 9/1996 | Havlovitz | |
| 5,570,814 A | 11/1996 | Havlovitz | |
| 5,597,092 A | 1/1997 | Havlovitz | |
| 5,607,079 A | 3/1997 | DeLaby et al. | |
| 5,842,648 A | 12/1998 | Havlovitz | |
| 5,873,533 A | 2/1999 | Sandbrook | |
| 5,934,573 A | 8/1999 | Weterrings et al. | |
| 6,145,711 A | 11/2000 | Prosper et al. | |
| 6,499,679 B1 | 12/2002 | Woodruff et al. | |
| 6,588,685 B2 | 7/2003 | Woodruff et al. | |
| 6,616,074 B2 | 9/2003 | Courtney et al. | |
| 6,817,552 B2 | 11/2004 | Kinkead et al. | |
| 6,851,634 B2 | 2/2005 | Woodruff et al. | |
| 2002/0014545 A1* | 2/2002 | Woodruff et al. | 239/650 |

OTHER PUBLICATIONS

Notification Concerning Transmittal of International Preliminary Report on Patentability (Chapter I of the Patent Cooperation Treaty) for PCT/US09/33392, mailed Nov. 18, 2010, 7 pages.

* cited by examiner

CARTRIDGE SPREADER SYSTEM

RELATED ED APPLICATIONS

This application is a divisional of U.S. patent application Ser. No. 12/347,752, filed on Dec. 31, 2008, and entitled "Cartridge Spreader System," which claims priority to and the benefit of the following provisional patent applications: (1) Ser. No. 61/051,867, filed on May 9, 2008, (2) Ser. No. 61/116,967, filed on Nov. 21, 2008, and (3) Ser. No. 61/122,953, filed on Dec. 16, 2008. The contents of these priority application are hereby incorporated by reference in their entirety.

FIELD OF THE INVENTION

The systems and methods described herein relate to cartridge spreader devices which are used in the consumer, professional or industrial markets, for example, to distribute granular product over terrain or other surfaces, and more particularly to a cartridge spreader device which engages removable cartridges containing granular product to be distributed over terrain or other surfaces.

BACKGROUND

Conventionally, consumers have applied granular lawn care product and other granular items to their property by using a granular product spreader. With the conventional granular product distribution system, consumers would primarily purchase their granular product in a bag or other container. Before they are able to apply the granular product to their property, however, consumers would have to manually open the bag, lift the bag, and pour the granular product into the hopper of a conventional spreader system. There are several drawbacks associated with this conventional approach to distributing granular product.

One drawback of the conventional apparatus and system for distributing granular product is that the process of opening a bag of granular product and pouring the granular product into the hopper is not always seamless. The granular product bag may have to be opened using a knife, scissors, or some other cutting device. Further, the consumer may not know how large of an opening to cut into the bag, and may cut an opening in the bag that is too large or too small, making it difficult to pour granular product into the hopper. Further, in the transfer process, the consumer needs to take care to not spill the product onto the ground when pouring it into the spreader. The transfer process may result in the consumer coming into closer proximity to the granular product than they prefer. There are other reasons why the consumer might not like the process of pouring granular product into the hopper. For example, some consumers may dislike the odor of the granular product, while others may find the bag heavy or cumbersome to pour. Some consumers may find the task of opening the bag of granular product and pouring the granular lawn care product into a hopper laborious. Some may find it difficult to pour the right amount of product into the hopper that will match the size of their yard or property.

Another drawback of the conventional granular product distribution system is that a bag of granular product may not be easily re-sealable for later use. As a result, some consumers may find it difficult to store the granular product after the bag or container has been opened. Further, some consumers may be concerned about storing an open bag of granular product in their homes or other high traffic areas. Finally, after dispensing the granular product with a convention spreader system, some consumers find it difficult to transfer any left-over amount back into the original product bag.

Yet another drawback of the conventional spreader systems is that the spreader itself may have an application rate adjustment mechanism that the consumer has to set correctly before applying the granular product to the lawn. Conventionally, some spreader settings are set in conjunction with the particular type of granular product being applied to the lawn; thus, consumers would have to look at the granular product bag, find the spreader setting listed on the bag, and then physically set the spreader setting in accordance with what is listed on the bag. Failure to use the correct spreader setting may result in the consumer dispensing product at a rate other than what is recommended on the label. In failing to use the correct setting, consumers may choose an application setting that may not be appropriate for the particular type of product. For example, consumers may use a setting from a previous application, which may not be optimum.

These and other drawbacks may be associated with conventional granular product distribution methods and devices.

SUMMARY OF THE INVENTION

Unlike conventional broadcast spreaders which require a consumer to open a bag of granular product, pour the product into a hopper, find (on the bag) and set (on the spreader) the appropriate flow rate, the cartridge spreader system described in the present application does not require a cutting, tearing, or other manual opening of the product-containing bag. Rather, the cartridge may be locked into the spreader and then easily activated by the user. Further, the cartridge spreader described in the present application requires no settings. The consumer may simply lock the cartridge into the spreader and trigger the activator handle to start applying the granular lawn product. This results in reliable, consistent product distribution. Additionally, the cartridge spreader described in the present application requires no pouring. The consumer may simply lock the cartridge into the spreader, trigger the activator handle to activate the spreader, and begin spreading lawn care product across their yard or other surface. In so doing, the consumer may apply product over their property without physically handling the granular product itself.

At the outset, it should be noted that the term "granular product" as used throughout this description, refers to product that is particulate (or granular) in nature in that it is a dry (not liquid) product that is flowable. For example, granular product may include without limitation, ice melting granules, fertilizer, pesticides, granular soil amendment material, granular oil absorbent material, dusting products, granular floor cleaning product, grass seed, or any other product that is dry and flowable.

The systems and methods described herein includes a spreader that may include at least one wheel which may be configured to rotate about at least one axle. The axle may be fitted to the spreader through axle fitments on the spreader frame and may be rotatably coupled to a gearbox assembly. The gearbox assembly may be rotatably coupled with a rotatable granular product launcher such that moving the at least one wheel forward will cause the launcher's rotating plate to rotate in a manner that broadcasts granular product in a swath of a desirable size (e.g. 8-10 ft). The broadcast spreader may also include EdgeGuard® technology which may prevent granular product from being thrown onto sidewalks, driveways, or other areas, as described in U.S. Pat. No. 6,616,074, which is hereby incorporated by reference in its entirety. The EdgeGuard® technology is mentioned in various places throughout the specification. In the specification, this feature will be referred to as "edge guard."

The spreader may further include a cartridge station. The cartridge station may be configured such that a cartridge containing granular product can engage directly with the spreader and then lock into place with a locking mechanism. The cartridge station may also include a granular chute of a fixed size that may facilitate the flow of product from the cartridge to the granular product launcher.

The systems and methods described herein also include a cartridge. The bottom of the cartridge may include a fitment component configured to engage with the cartridge station of the spreader. The fitment component functions to control the flow of product from the cartridge and may include a metering gate of particular size that allows the correct amount of product to flow onto the rotatable granular product launcher. Thus, the product may be dispensed without having to adjust any settings on the spreader. When the cartridge is engaged with the cartridge station of the spreader, the cartridge, and particularly the fitment component, may fit in a predetermined orientation. This may be accomplished through a special mating shape design. In some embodiments, the cartridge may lock onto the spreader automatically (spring-loaded), while in some embodiments the spreader may have a locking handle or lever a user may activate to lock the cartridge into place. Other methods for locking the cartridge include, by way of non-limiting example: bayonet lock, snap fit, threaded fit, slide actuation, lug closure, or magnetic interlocking.

Once a cartridge is engaged with the spreader, the user may activate the cartridge to allow product to automatically flow at a fixed flow rate when the spreader is pushed by a user. In some embodiments, for example, a protrusion in the cartridge may engage with the spreader to enable on/off flow control. The protrusion may be connected to a spring-loaded on/off lever on the spreader handlebar that the user may actuate to control the flow of granular product. The lever may be connected to the cartridge via a sheathed cable. When the lever is actuated, the cartridge may be opened and product may flow out of the cartridge and onto the rotatable product launching plate of the product launcher which then may broadcast the product out in front of the spreader. The lever may be spring-loaded, such that when the lever is released, the cartridge may be closed and the flow of product may be stopped.

The cartridge may also include an agitator to help prevent product from bridging as it flows out of the cartridge. The agitator mechanism may "key" into the launcher gearbox, such that rotation of the spreader wheels results in rotation of the agitator. In some embodiments, the agitator may not be necessary for a flowable product, but can be added for products with a tendency to bridge.

The cartridge may also be configured such that when the consumer releases or disengages the cartridge from the spreader, the cartridge may automatically seal (e.g. a shutoff plate may block product from flowing out of the container) so that no residual product flows out of the cartridge during the removal process or during storage. In some embodiments, when the spreader is not in use (e.g. in an idle position) a front upright support stand and/or foot rest may keep the spreader in the upright position. This stand may keep the spreader stable with or without a cartridge attached and may provide a convenient position for the user to stabilize the spreader as the cartridge is inserted and engaged.

According to one embodiment of the systems and methods described herein, a mobile device for spreading, over terrain or other surface, granular product applications contained in a cartridge is provided. The device comprises: a granular product launcher; a cartridge station comprising: at least one cartridge engager; a particle conveyor configured to facilitate the flow of granules from the cartridge to the granular product launcher; a cartridge activator, configured to activate and deactivate the flow of granular product out of a cartridge; and an activation controller configured to control the cartridge activator and thereby control the activation and deactivation of an engaged cartridge.

In another embodiment of the systems and methods described herein, a cartridge containing granular lawn care product or other granular applications is provided. The cartridge comprises: a container; a fitment functionally joined to the container comprising: a fitment shell configured to be joined to an end of the container; a flow metering gate configured to dictate the flow rate of granular product; an activator configured to activate and deactivate the flow of granular product out of the cartridge.

In yet another embodiment of the systems and methods described herein, a system for distributing granular product across terrain or other surface is provided. The system comprising: a spreader device comprising: a particle launcher; a cartridge station configured to engage with a cartridge, comprising: a particle conveyor configured to facilitate the flow of granules from the cartridge to the particle launcher; a cartridge activator, configured to activate and deactivate the flow of granular product out of a cartridge; an activation controller configured to control the cartridge activator and thereby control the activation and deactivation of an engaged cartridge; a cartridge comprising: a container; a fitment configured to engage with the cartridge station comprising: a metering mechanism, wherein the flow of granular product is controlled by the metering mechanism in the cartridge.

In still another embodiments of the systems and methods described herein, a mobile device for spreading, over terrain or other surfaces, granular product contained in a cartridge is provided. The mobile device comprising: cartridge engaging means for engaging a cartridge with the spreader; locking means for locking the cartridge onto the spreader; activating means for activating the cartridge to allow granular product to flow; broadcasting means for broadcasting granular product across terrain; deactivating means for deactivating the cartridge to prevent granular product from flowing; controlling means for controlling activation and deactivation of the cartridge; upright resting means for allowing the spreader to stand upright in a resting position; frame collapsing means for collapsing spreader into a compact form.

DETAILED DESCRIPTION OF THE INVENTION

The following description is intended to convey a thorough understanding of the embodiments described by providing a number of specific embodiments and details involving a cartridge spreader system. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
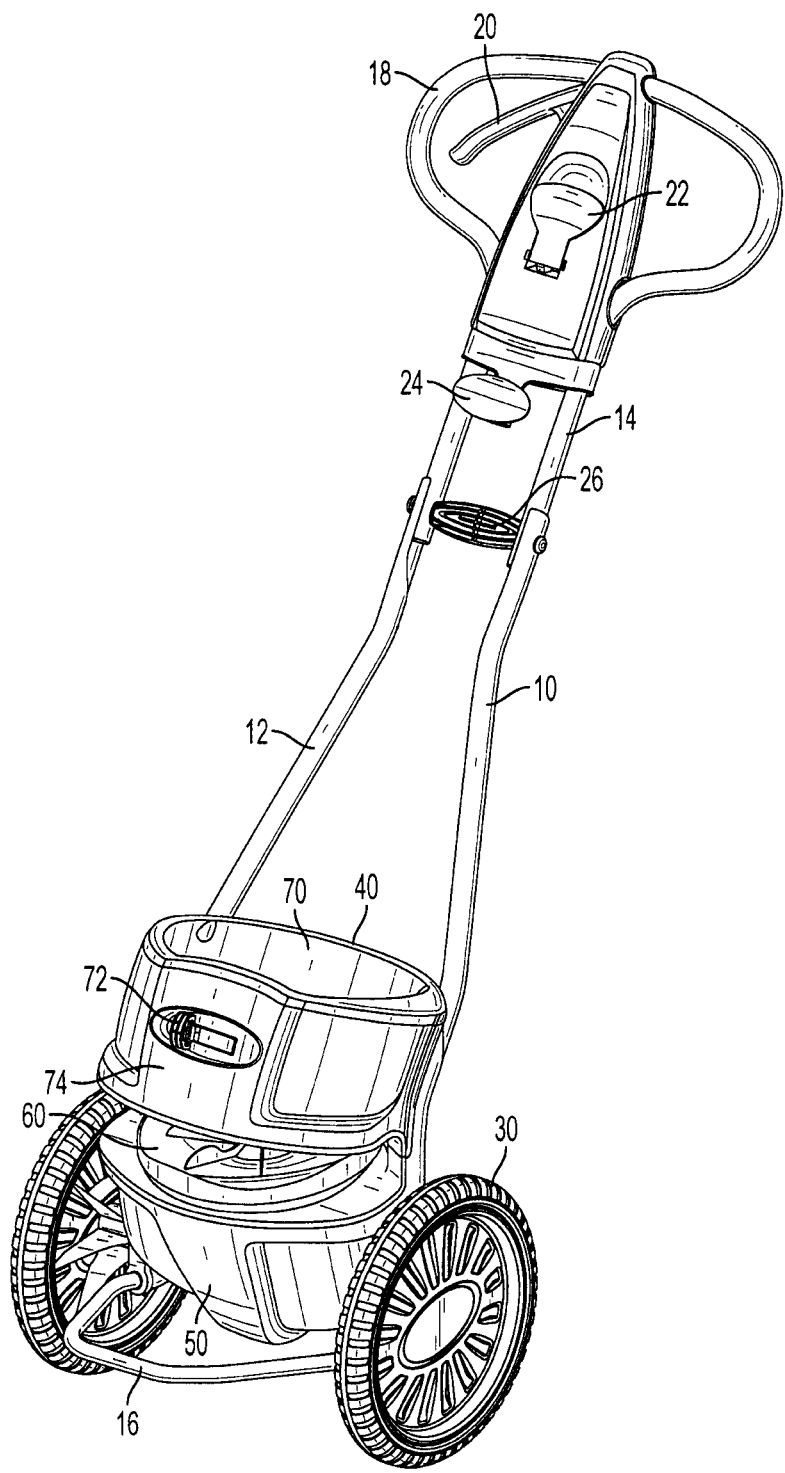
FIG. 1 depicts a perspective view of a spreader, according to an embodiment of the systems and methods described herein.

FIG. 1 illustrates a perspective view of a spreader. The spreader device may be a movable device configured for broadcasting granular product onto a lawn, terrain, or other surface. The spreader device may include a spreader body 40 and a spreader frame 10. The spreader frame 10 may include a lower frame 12 which may include axle fitments 28 (shown in FIG. 1(a)), an upper handle assembly 14, and an upright stand 16. In some embodiments, the upright stand 16, the axle fitment 28, upper handle assembly 14 and lower frame 12 may comprise a single continuous component or structure, while in other embodiments, each may comprise a separate or distinct component or structure, as shown.

Figure 1A:
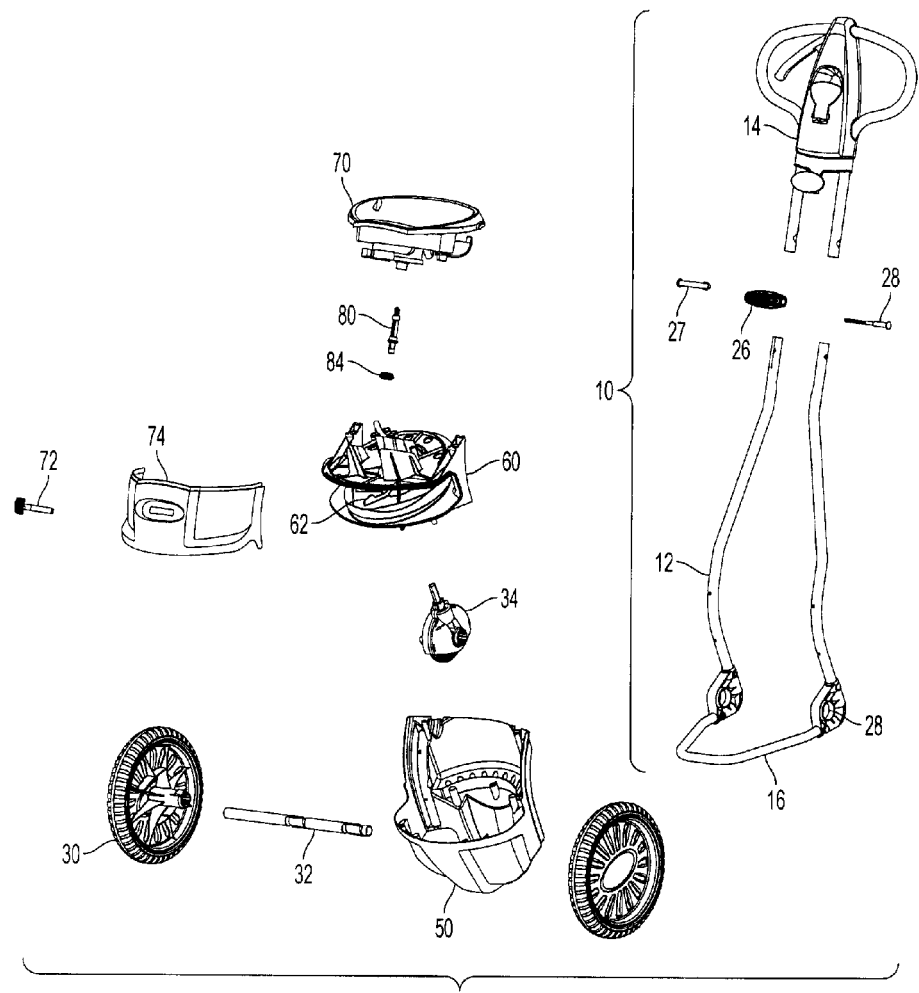
FIG. 1(a) depicts an exploded view of various components of a spreader, according to an embodiment of the systems and methods described herein.
Figure 1B:
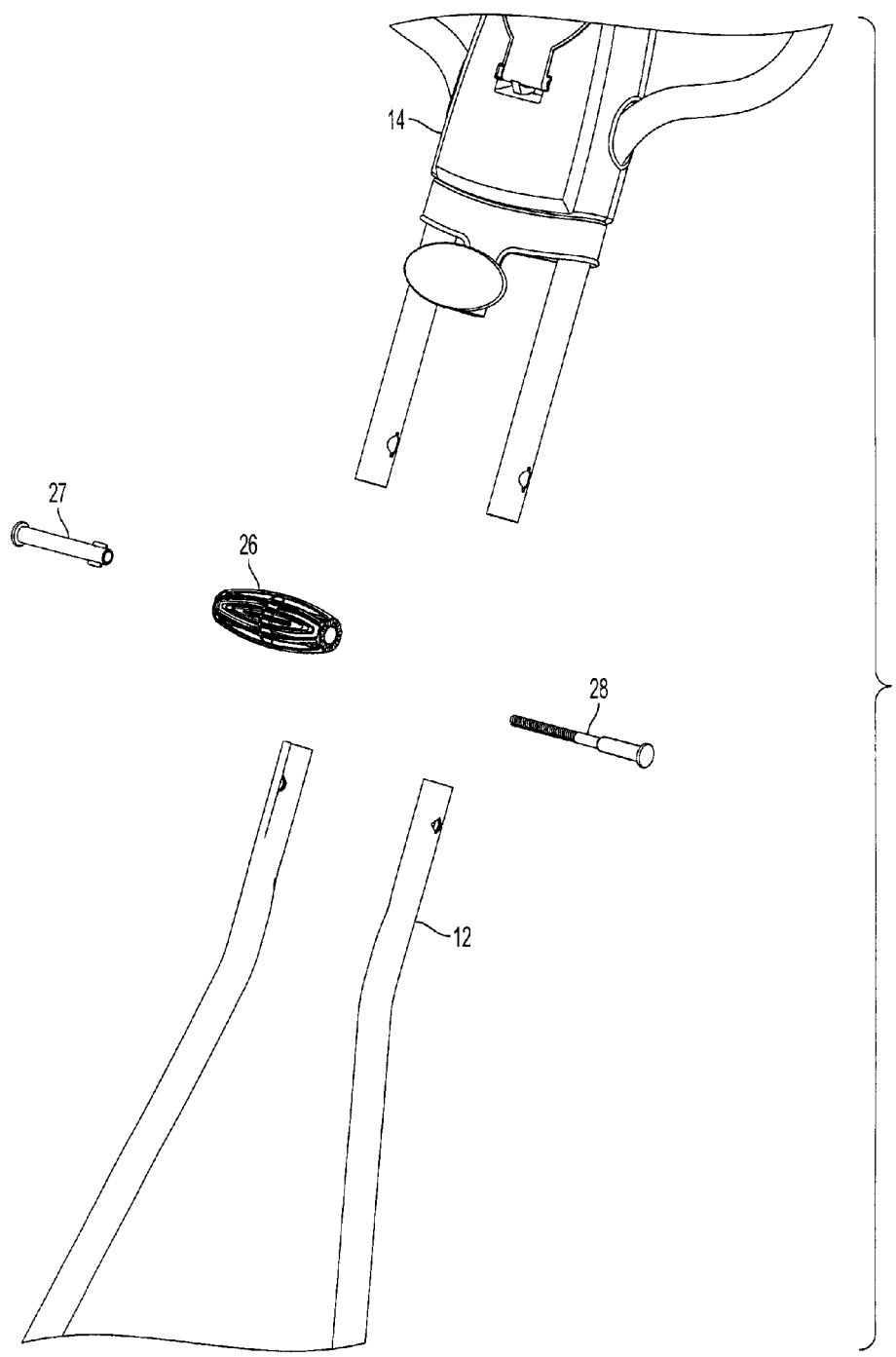
FIG. 1(b) depicts an view of the attachment between the upper and lower frame assembly, according to an embodiment of the systems and methods described herein.
Figure 1C:
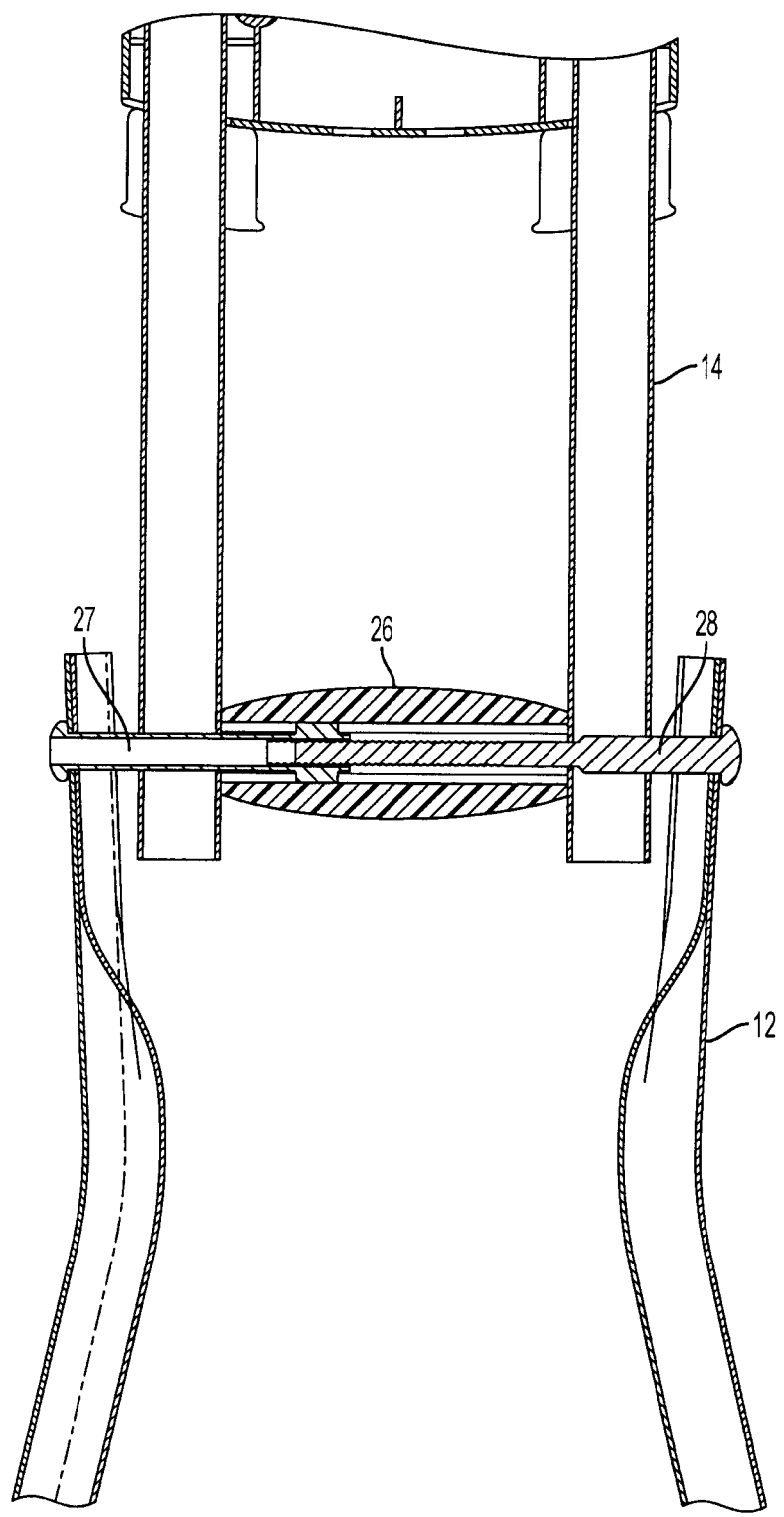
FIG. 1(c) depicts an view of the attachment between the upper and lower frame assembly, according to an embodiment of the systems and methods described herein.
Figure 8:
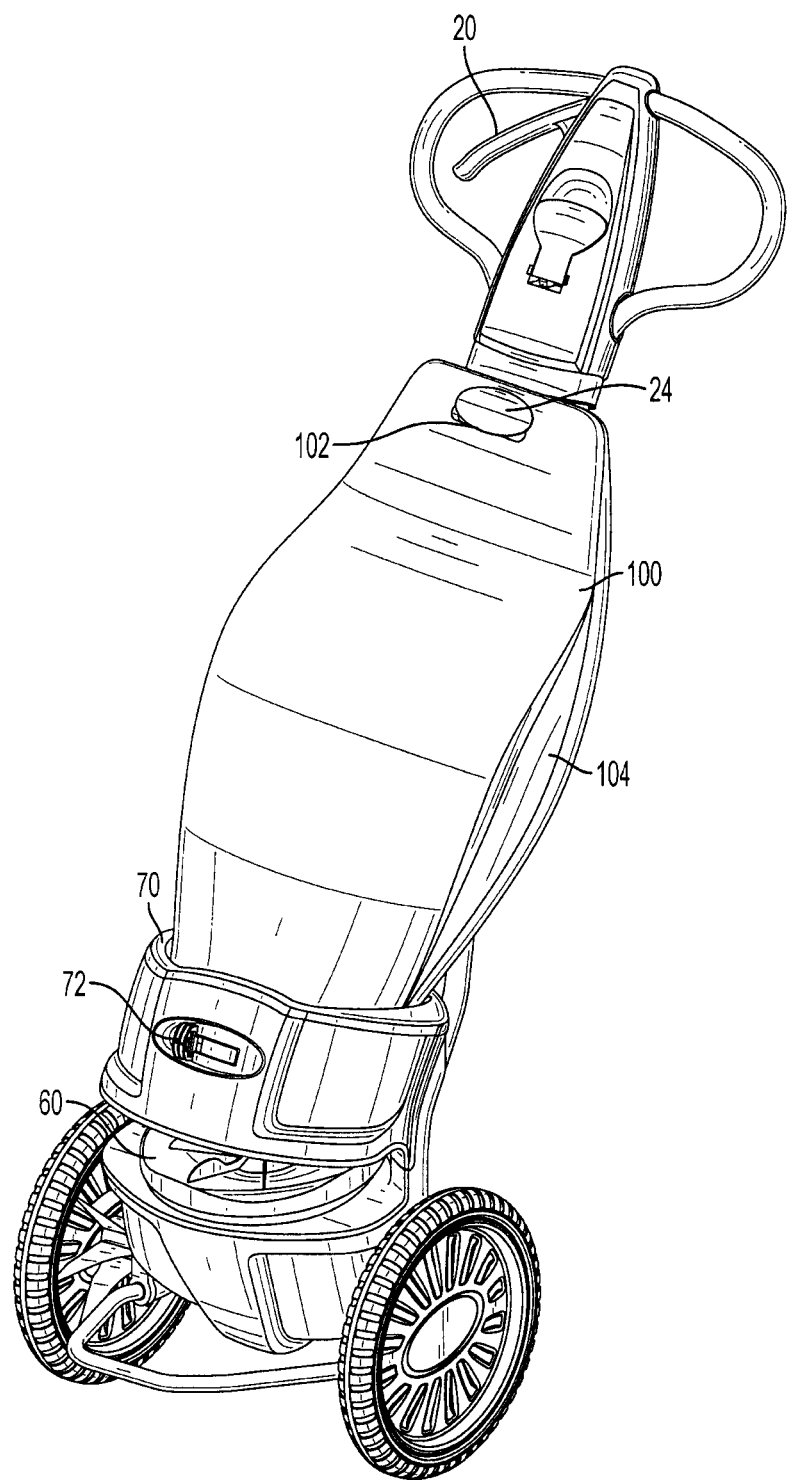
FIG. 8 depicts a front elevation view of a spreader with a cartridge attached, according to an embodiment of the systems and methods described herein.
Figure 25:
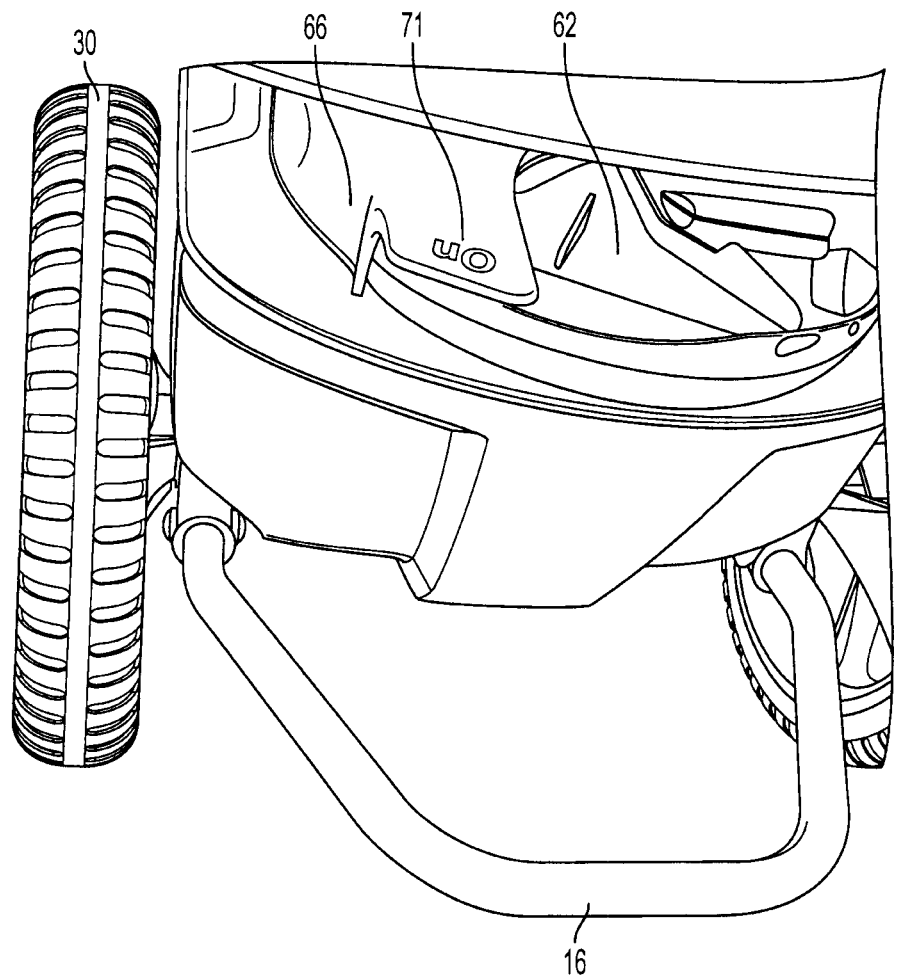
FIG. 25 is a view of the granular product launcher which specifically depicts the edge guard feature rotated in an "on" position, according to an embodiment of the systems and methods described herein.

In some embodiments, upper handle assembly 14 may be configured to be removably connected to lower frame 12 via a handle lock tube 26, which is depicted in more detail in FIG. 1(c). The upper handle assembly 14 may also include a frontwardly protruding abutment 24 to which a cartridge container, as shown in FIG. 8, may be attached for additional stabilization of the cartridge container. The upper handle assembly 14 may also include a controller 22 for activating or deactivating an edge guard feature. Activation of the edge guard feature may comprise rotating or otherwise positioning an edge guard component (shown as 66 in FIG. 21) partially outside the periphery of the granular product launcher 60 to prevent granular product from being thrown onto sidewalks, driveways, or other areas. The edge guard feature may also include a visual indicator (as shown in FIG. 25) that may allow the consumer to see when the edge guard is in an activated position. The visual indicator may be a protruding piece, for example, that may stick out when the edge guard is in the activated state. In some embodiments, edge guard controller 22 may be a mechanical lever, as shown, while in some embodiments it may be an electrical switch. In addition, edge guard controller 22 may, in some embodiments, include a digital or analog adjuster to control the amount that the edge guard rotates over the periphery of the granular product launcher 60.

Upper handle assembly 14 may also include a cartridge activator controller 20. The cartridge activator controller 20 may be physically linked to the cartridge station 70 (e.g., via cabling as shown in FIGS. 2(a), 3(a), 13(c), 16(b), 16(c) such that the cartridge activator controller 20 provides a mechanical control of the cartridge activator. The cartridge activator controller 20 may also be linked to the cartridge station 70 such that the cartridge activator controller 20 may dictate the movement of the cartridge activator through an electronic control mechanism or device. The cartridge activator controller may also be configured to wirelessly control the cartridge activator on the cartridge station 70. Upper handle assembly 14 may also include a handle structure 18, which may be ergonomically designed to allow for easy control over the movement of the spreader 10.

The spreader device may include a spreader body 40. The spreader body 40 may be made of a variety of plastic resin, metal, or other desirable material(s). The spreader body 40 may include a spreader lower housing 50 and a granular product launcher 60 which operates to propel granular product onto property terrain, or other surface. The spreader body 40 may also include a cartridge station 70 into which a cartridge is inserted and engaged as further described herein. The spreader lower housing 50 may provide structural support for the spreader device, which may allow the spreader to be balanced and sturdy. The spreader body 50 may include one or more axle clearance holes, which may be configured to be intersected by or contained by an axle to which two wheels 30 can connect. It should be noted that the figures, which depict the spreader as having two wheels, are merely exemplary. In some embodiments, the spreader may have a single wheel and in some embodiments the spreader may have two or more wheels. To the extent that this specification refers to "wheels" it is an exemplary reference only and should not be construed as limiting the scope of the systems and methods described herein. In some embodiments, the spreader lower housing 50 may be eliminated and the axle may be held in place with the axle fitments on the tubular handle.

Granular product launcher 60 (and in particular launching plate 62) may be configured to launch granular product across a swath of property or other terrain (e.g. lawn) of predetermined width. Granular product launcher 60 may be configured as a plate-like device 62 which rotates about a central axis in accordance with the rotation of the at least one wheel on at least one axle. In particular, granular product launching plate 62 may be rotatably coupled to the at least one axle 32 such that there is a positive correlation between the revolutions per minute of the at least one wheels and the revolutions per minute of the granular product launching plate 62.

Spreader body 40 may also include a cartridge station 70. Cartridge station 70 may be configured to receive and engage a cartridge of granular product as described herein. Cartridge station 70 may include a front panel 74 which may include a cartridge locking switch 72. The cartridge locking switch 72 may be automatically or manually engaged in on and off position, for example, to lock or unlock a cartridge inserted into cartridge station 70.

In some embodiments, the cartridge locking switch 72 may be turned on and off by manual or electro-mechanical device or means. It may be automatically set to secure the cartridge after a predetermined event, or it may be programmable so that the consumer has the capability of automating the process of securing and stabilizing the cartridge into the cartridge station 70. In some embodiments, the cartridge locking switch 72 may be located at the handlebar area 18 or elsewhere on the spreader.

FIG. 1(a) depicts an exploded view of various components of the spreader of FIG. 1. On the lower frame 12 of the spreader frame 10, axle fitments 28 may be included. Axle 32 may be threaded through axle fitments 28 and gearbox 34. At least one wheel 30 may be connected to the at least one axle 32. In some embodiments, rotation of at least one axle 32 may cause rotation of the gearbox 34, which may drive the launching plate 62 of the launcher 60. The launcher 60 may be connected to the cartridge station 70 at least by way of agitator driver 80 and bevel gear 84. In some embodiments, spreader lower housing 50 may include clearance holes which may be joined or otherwise aligned with axle fitments 28 to receive axle 32. The upright stand 16 may be configured as a contiguous piece of the lower frame 12.

In some embodiments, the front panel 74 of the cartridge station 70 may be configured such that a locking switch 72 may be positioned by a user, for example, in the locked and unlocked positions when a cartridge has been inserted into cartridge station 70. For example, after a cartridge is positioned within cartridge station 70, a user may secure the cartridge in a locked position by moving the locking switch into the locked position. To remove the cartridge, the user may move the locking switch to the unlocked position.

In some embodiments, the upper frame assembly 14 and the lower frame assembly 12 of the spreader frame 10 may be connected via a handle lock tube 26. FIG. 1(b), for example, depicts an upclose exploded view of the attachment between the upper frame assembly 14 and lower frame assembly 12. FIG. 1(c) depicts an upclose view of the attachment between the upper and lower frame assemblies 14 and 12, respectively. As shown, upper and lower frame assemblies 14 and 12 may be connected with a handle lock tube 26 which may work in conjunction with handle lock nut 27 and handle lock bolt 28. The handle lock tube 26 may be adjusted to tighten, loosen, or disengage the connection between the lower frame 12 and the upper handle assembly 14. In some embodiments, the handle lock tube 26 may be configured such that twisting the tube in one direction or another will loosen or tighten the connection between the lower frame and the upper handle assembly. When the handle lock tube is twisted, the upper frame assembly 14 may be able to swivel about the handle lock bolt axis, allowing the upper frame assembly 14 to be folded down for easier storage.

In some embodiments, the handle lock tube may engage with a keyed internally threaded sleeve, which may engage with an externally threaded rod. The threaded rod and the threaded sleeve may pass through holes in the upper and lower handle tubes. The externally threaded rod may be keyed to the hole in the handle tubing so it cannot rotate. The internally threaded sleeve may rotate within the clearance holes in the handle assembly. As the handle lock tube is rotated to tighten, it may make the threaded sleeve move along the threaded rod, which may shorten the horizontal dimension between the ends of the handle assembly. This may allow the mating shapes at the end of the lower handle to engage with the upper handle and may apply frictional pressure to secure the handle. In some embodiments, the handle lock tube also has an external rounded shape that allows it to function as an easy carry handle for the entire applicator. In an alternative embodiment, the handle lock tube may engage the upper and lower frame assemblies by way of a conventional wing nut and bolt, cam lock, or bayonet assembly.

Figure 2:
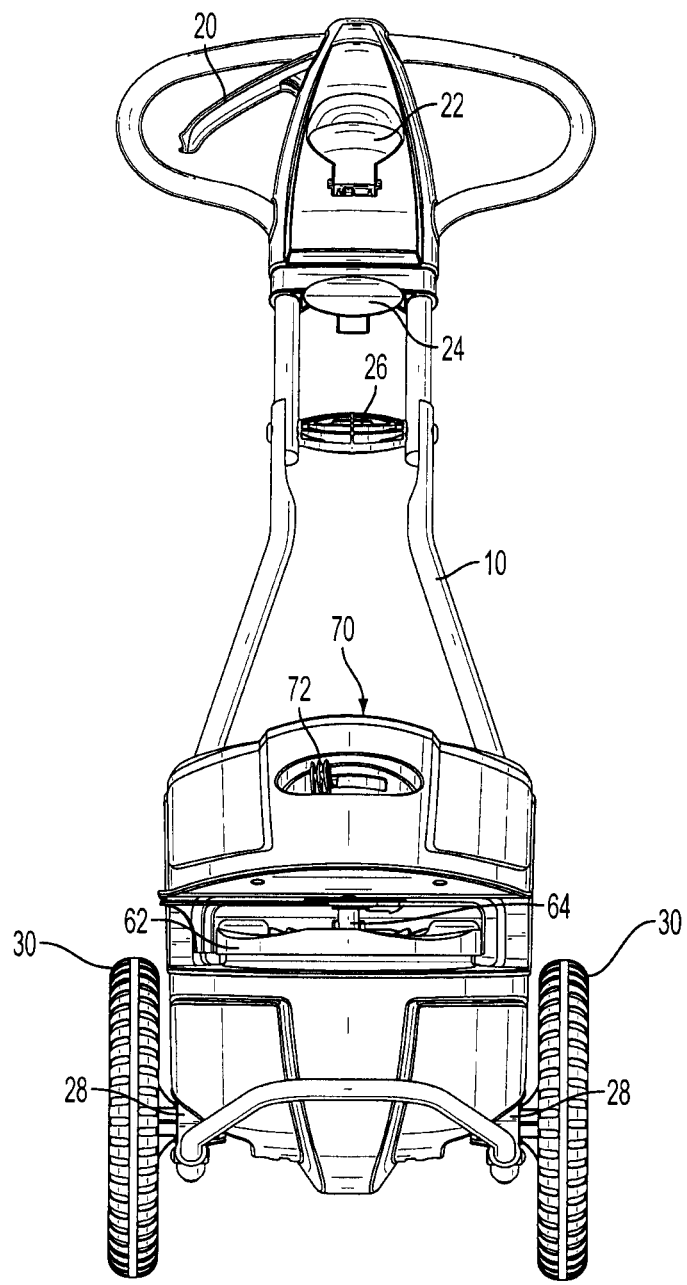
FIG. 2 depicts a front elevation view of a spreader, according to an embodiment of the systems and methods described herein.
Figure 2A:
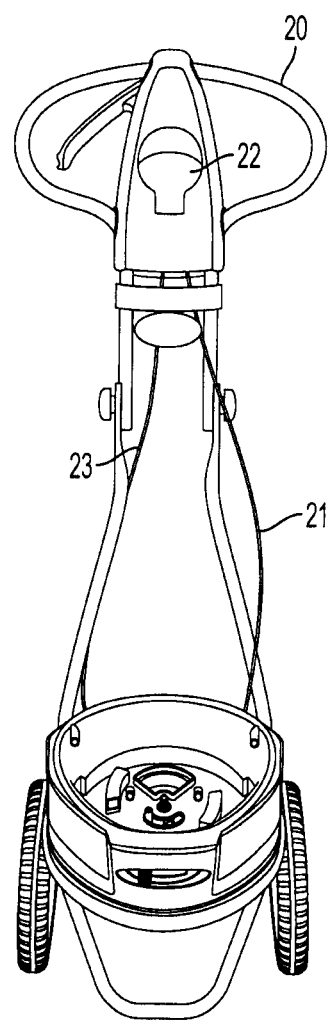
FIG. 2(a) depicts a front elevation view of a spreader including cables connecting components in the upper frame assembly to the cartridge station, according to an embodiment of the systems and methods described herein.

FIG. 2 illustrates a front elevation view of the spreader of FIG. 1. In addition to showing much of what was described above with respect to FIG. 1, this view illustrates the drive shaft connection 64 between the granular product launcher 60 and the cartridge station 70. As described in greater detail below, the rotation of the drive shaft connection granular product launching plate 62 drives the agitator shaft 80 (shown in FIG. 5) of the cartridge station 70. The two rotating shafts 64 and 80 may be rotatably coupled through a bevel gear. The spreader frame 10 may be configured with axle fitments 28 such that at least one axle may be threaded through the frame itself. Wheels 30 may be joined on a common axle to provide mobility to the spreader. In some embodiments, at least one axle fitments 28 on the spreader frame may be joined or otherwise aligned with the one or more axle clearance holes of the spreader lower housing 50 to provide structural support, sturdiness, and stabilization for the spreader device. In some embodiments, however, the axle may be structurally held in place with the axle fitments attached to the lower frame assembly. The plastic lower housing may therefore may simply act as a cover to complete the overall form and hide the mechanisms.

FIG. 2(*a*) depicts a front elevation view of a spreader including cables connecting from the upper frame assembly to the cartridge station. A cable 23 may functionally link the edge guard controller 22 with the edge guard. A cable 21 may functionally link the activator controller 20 with the cartridge activator at the cartridge station. Each cable may therefore operate to activate or engage the appropriate component within spreader body 40.

Figure 3:
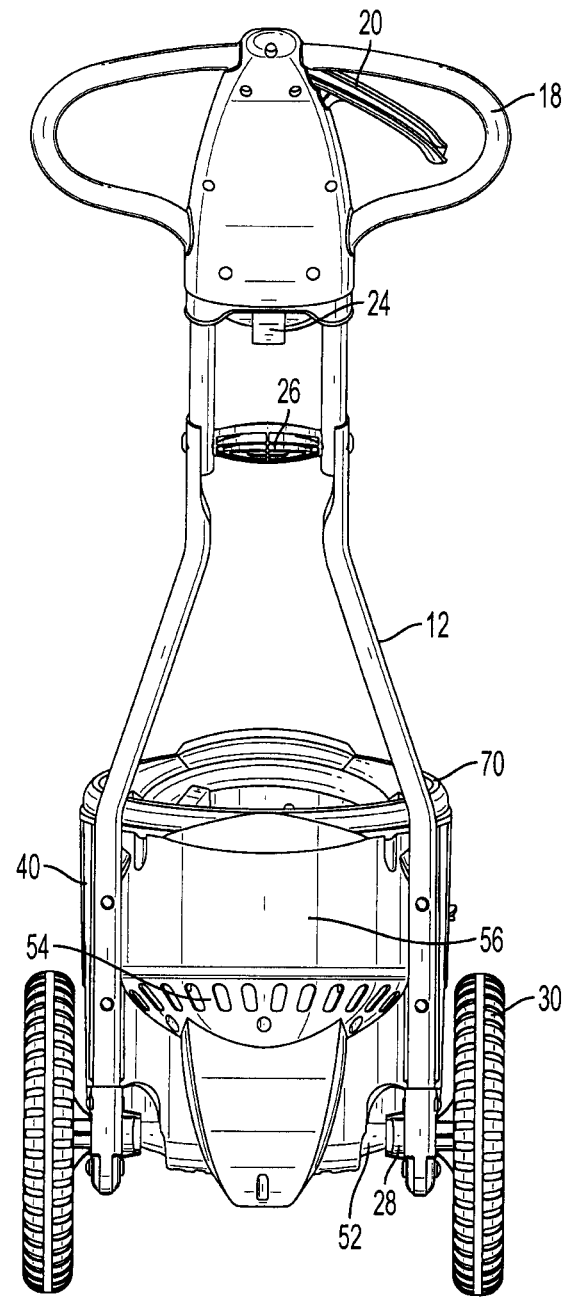
FIG. 3 depicts a rear elevation view of a spreader, according to an embodiment of the systems and methods described herein.
Figure 3A:
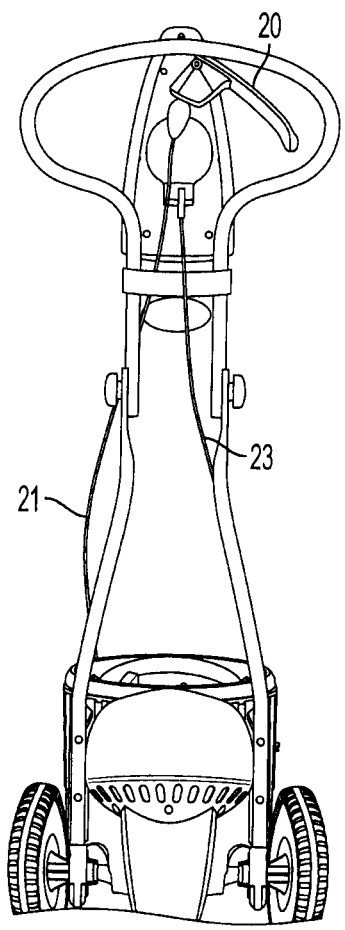
FIG. 3(a) depicts a rear elevation view of a spreader including cables connecting components in the upper frame assembly to the cartridge station, according to an embodiment of the systems and methods described herein.

FIG. 3 depicts a rear elevation view of the spreader. The top of cartridge station 70 is shown from this view. Wheels 30 are shown as being connected through axle fitments 28 and clearance holes 52. Upper housing panel 56 and ventilation holes 54, which are a part of spreader lower housing 50 are illustrated. The ventilation holes 54 in the spreader lower housing 50 allow product a way out of the contained housing so that product does not build up on the inside of the spreader lower housing and potentially cause clogging or interference with the rotation of the granular product launching plate 62 (as shown, for example, in FIG. 2). The ventilation holes 54 may provide a way for granular product collected behind the launching plate to escape the spreader and not cause a potential malfunction. The ventilation holes 54 also help with cleaning of the spreader. This rear view illustrates that the wheels 30 may be connected on a common axle which may be threaded through axle fitments 28 on the lower handle assembly 12 and clearance holes 52 of the spreader lower housing 50. In some embodiments, the axle fitment 28 of the lower assembly and the axle clearance hole 52 of the spreader lower housing 50 may be flush against one another.

FIG. 3(*a*) depicts a rear elevation view of a spreader including cables connecting controls at the upper frame assembly to the cartridge station 70. Each cable may therefore operate to activate or engage the appropriate component within spreader body 40. For example, cable 23 may functionally link the edge guard controller 22 with the edge guard component 66 (shown in FIG. 21). Similarly, cable 21 may functionally link the activator controller 20 with the cartridge activator 78 (shown in FIG. 5) at the cartridge station 70.

Figure 4:
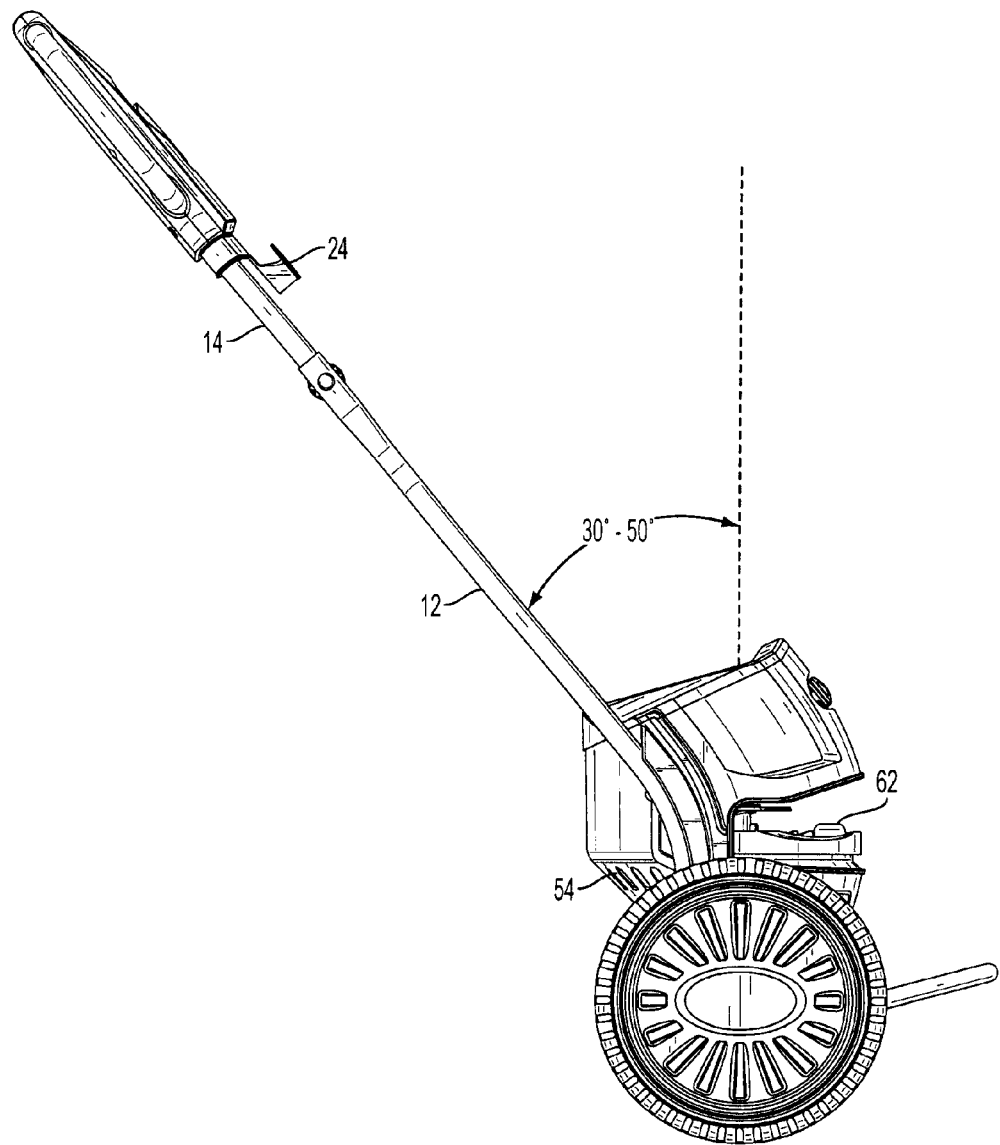
FIG. 4 depicts a side elevation view of a spreader, according to an embodiment of the systems and methods described herein.

FIG. 4 depicts a side elevation view of the spreader of FIG. 1. This illustration shows many of the features discussed in reference to FIGS. 1-3. Additionally illustrated is the depth of the container attachment handle 24. Further, FIG. 4 illustrates that the ventilation holes 54 of the spreader lower housing may be disposed on an inward sloping face of the spreader lower housing. This may allow more room for excess granular product to escape from the contained area should a build-up occur. Further, the ventilation holes 54 may be disposed at or below the bottom height of the granular product launching plate 62. Such disposition may allow the ventilation holes a greater likelihood of providing stray granular product with a window to escape. Also, as shown the spreader is in the approximate position it would be when being pushed by a user.

Figure 4A:
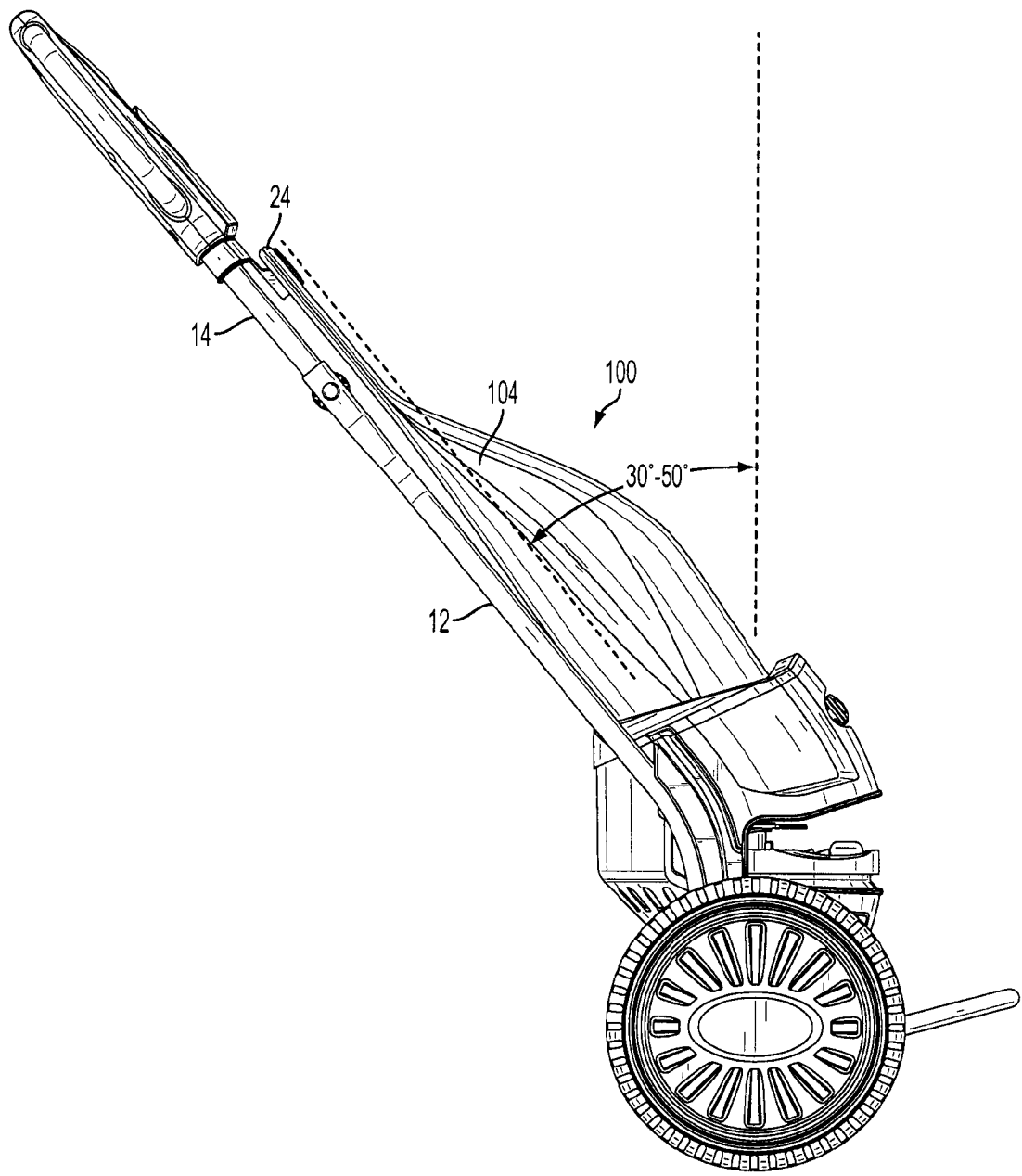
FIG. 4(a) depicts a side elevation view of a spreader with an engaged cartridge, according to an embodiment of the systems and methods described herein.
Figure 5:
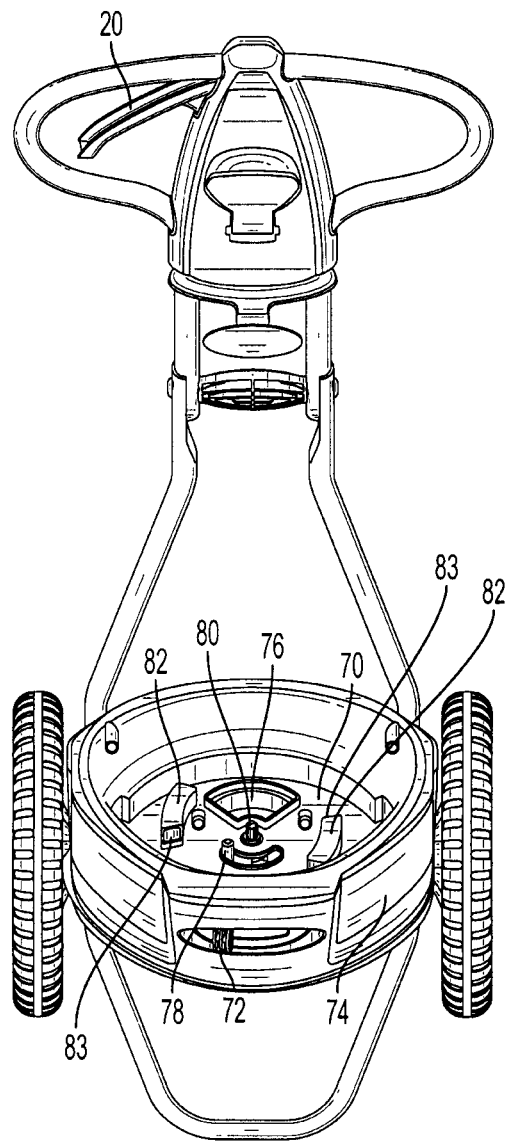
FIG. 5 depicts a top plan view of a spreader, according to an embodiment of the systems and methods described herein.
Figure 7:
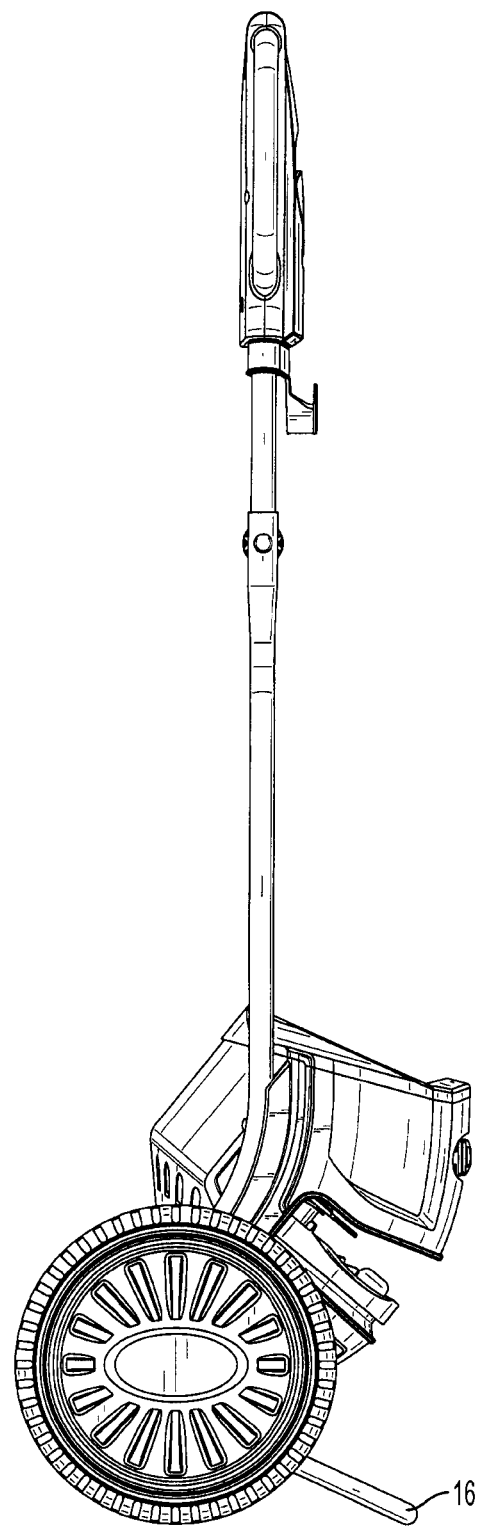
FIG. 7 depicts a side elevation view of a spreader in the upright position, according to an embodiment of the systems and methods described herein.
Figure 9:
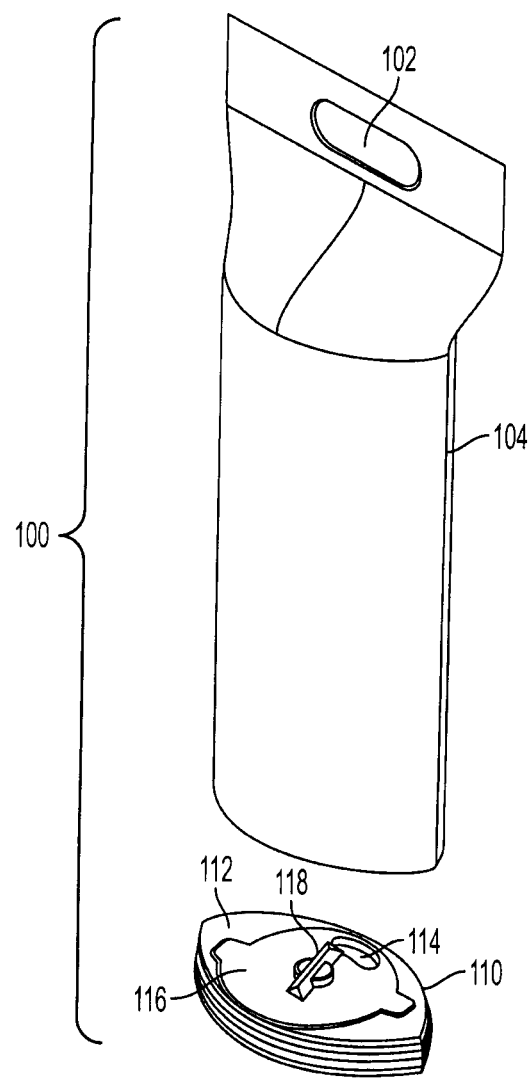
FIG. 9 depicts a view of the cartridge fitment (top/inside view) and cartridge container, according to an embodiment of the systems and methods described herein.
Figure 18:
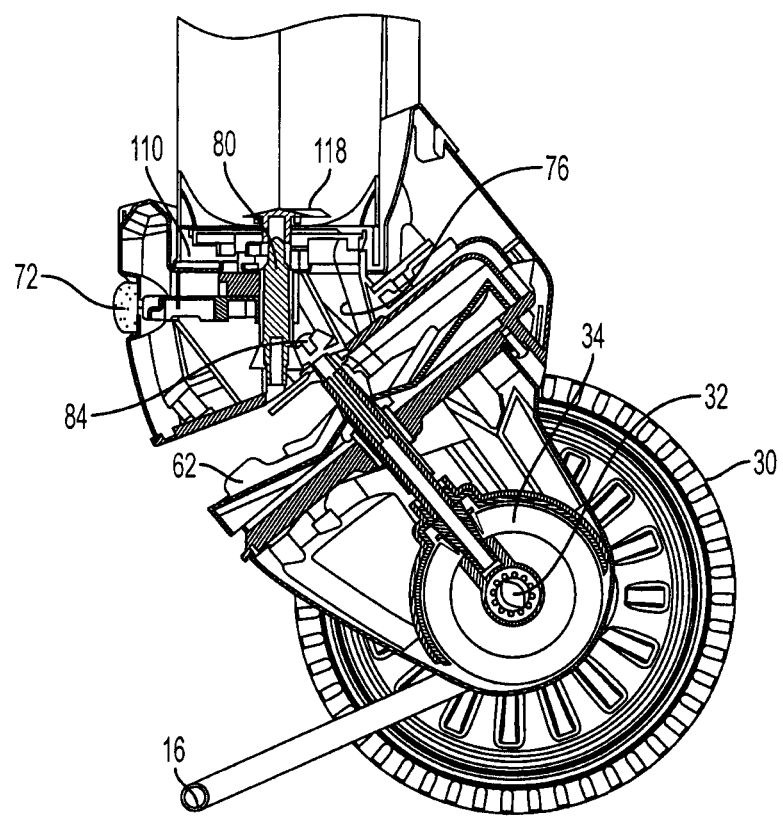
FIG. 18 depicts a close-up cross sectional view of the spreader lower housing with the cartridge engaged, according to an embodiment of the systems and methods described herein.

As shown in FIG. 4*a*, the container when engaged in cartridge station 70 may essentially be positioned approximately 30-50 degrees off the dashed vertical line, in much the same manner as upper frame assembly 14 and lower frame 12 are shown in FIG. 4. The positioning of the cartridge in this manner offers several benefits. For example, the positioning changes the center of gravity of the spreader and thereby enhances its maneuverability during use. In addition, by engaging the container in an angular position relative to the dashed vertical line, product is able to more easily flow out of the container and onto launching plate 62. In particular, as shown in FIGS. 5, 9 and 18(*a*), for example, product is able to more easily flow out of the container as a result of placing the metering gate 114 in such a way that product is urged to flow down through it, rather than accumulate around it as would be the case were the container positioned in an upright manner. Put another way, the angular positioning of the container relative to the dashed line enables the "funneling" product in a desired flow path. Of course, the relative positioning of the container relative to the vertical would change during actual use of the spreader, but the relative positioning of FIGS. 4 and 4*a* is offered only as an example to better appreciate the appearance of the spreader during use. In contrast to the positioning of the spreader shown in FIGS. 4 and 4*a*, FIG. 7 depicts a side elevation view of a spreader in its resting, upright position—resting on the upright stand 16.

FIG. 4(*a*) depicts a side elevation view of the spreader of FIG. 1 with a cartridge engaged. This illustration shows many of the features discussed in reference to FIGS. 1-4. The figure illustrates that cartridge 100 may include a container 104 which may be attached to the container attachment handle 24 which may provide additional stability to the container. When the cartridge is engaged as shown, the upper frame assembly 14 and lower frame assembly 12 may act together as a single frame entity. Also, as shown the spreader is in the approximate position it would be when being pushed by a user. The cartridge 100 may engage with the cartridge station 70 (which is illustrated, for example, in FIG. 13). When engaged in the cartridge station 70, the container may be positioned approximately 30-50 degrees off of the dashed vertical line and may be substantially parallel with upper frame assembly 14 and lower frame assembly 12.

FIG. 5 depicts a top plan view of the spreader. Cartridge station 70 may be configured to receive, engage and activate a cartridge of granular product. In some embodiments, cartridge station 70 may be configured to engage a cartridge fitment because of the arrangement of the mechanical features (e.g. the mechanical features and design of the cartridge station 70 may be matched to facilitate mechanical engagement and locking of a cartridge as described herein). In some embodiments, cartridge station 70 may be configured to engage a cartridge fitment because of the shape and size of the perimeter of the station. Cartridge station 70 may also be configured to engage a cartridge fitment because of a magnetic effect or by adhering to the cartridge fitment. In some embodiments, the cartridge station 70 may be configured to engage with a cartridge fitment through a membrane puncture.

Figure 11:
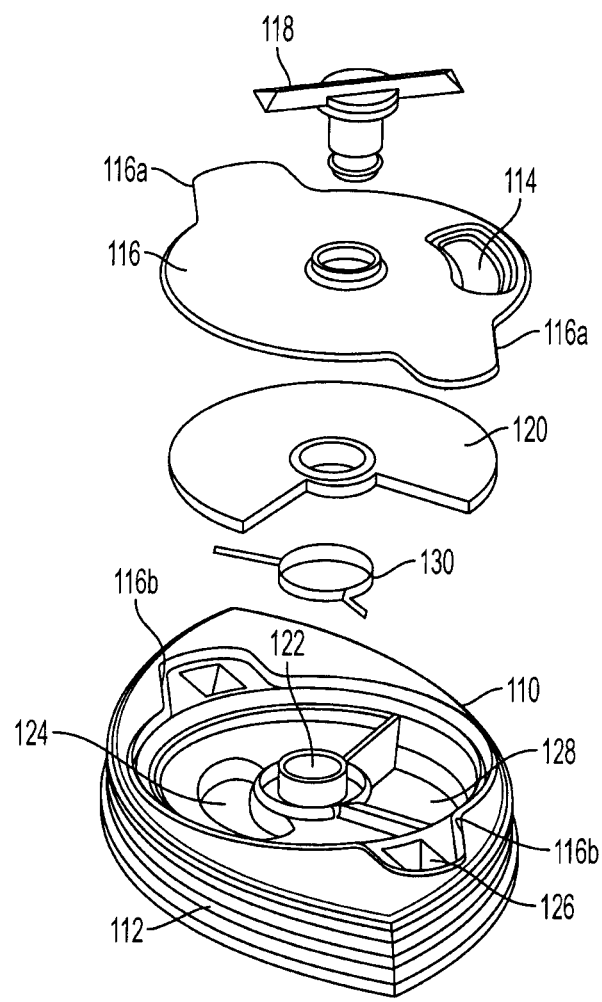
FIG. 11 depicts various layers on the inside face of the cartridge fitment, according to an embodiment of the systems and methods described herein.

As shown in FIG. 5, cartridge station 70 may include a granular chute 76 through which granular product may flow from the cartridge down onto the granular product launching plate 62 (shown in FIG. 5, for example) during use. To facilitate flow from the cartridge down into the spreader, cartridge station 70 may include an agitator shaft 80 which may be configured to engage with and drive the rotation of an internal cartridge agitator 118 (as shown in FIG. 11) which may be included inside the cartridge. In some embodiments, cartridge station 70 may also include cartridge stabilizers 82. The cartridge stabilizers 82 may include rotatable stabilizing engagers 83 that move in conjunction with the position of cartridge locking switch 72, which may be disposed on the front panel 74 of the cartridge station 70. As described in more detail in FIG. 13, after a cartridge is inserted into cartridge station 70 and locking switch 72 is moved to the lock position, cartridge stabilizers 82 may securely engage and lock the cartridge via rotatable stabilizing engagers 83.

In some embodiments, cartridge station 70 may also include cartridge activator 78. Cartridge activator 78 may comprise a shiftable abutment that may be configured to mechanically engage with a cartridge shut-off plate 120 (as shown in FIG. 11). In particular, cartridge activator 78 may, when activated, cause shut-off plate 120 to slide so that it does not block granular product from flowing downwards with the pull of gravity. In some embodiments, cartridge activator 78 may be controlled from the handlebar assembly with cartridge activator controller 20. In particular, when a user pulls or squeezes cartridge activator controller 20 on the handlebar, the flow of the granular product from the cartridge is activated. When the cartridge activator controller 20 is released and permitted to return to the position shown in FIG. 5, the position of the cartridge shut-off plate is such that flow of the granular product out of the cartridge is blocked. The cartridge activator controller 20 is not limited to a trigger location on the handlebar assembly. Indeed, the cartridge activator controller 20 may be arranged in any convenient location on the spreader device. In some embodiments, the cartridge activator controller may be electronic, in which case a mechanical link may not be necessary. In some embodiments, the cartridge activator controller may communicate wirelessly with the cartridge activator, in which case a physical link may not be necessary. The cartridge activator controller may be manual, automatic, or semi-automatic.

Figure 6:
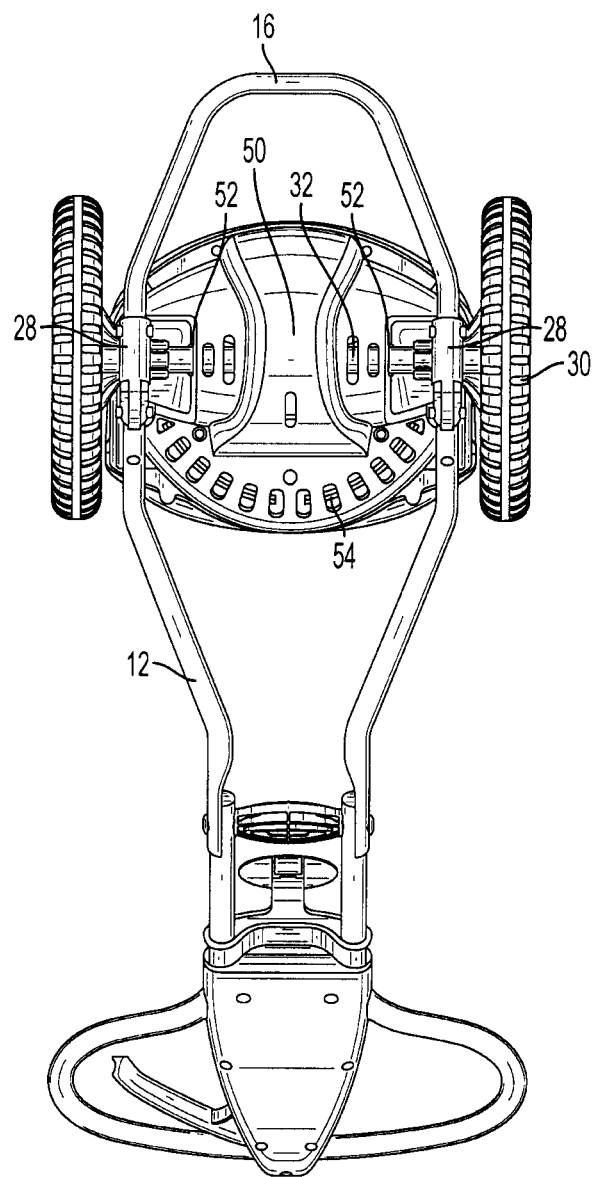
FIG. 6 depicts a bottom plan view of a spreader, according to an embodiment of the systems and methods described herein.

FIG. 6 depicts a bottom plan view of a spreader. The ventilation holes 54 may be configured to allow errant granular product (and any collected water that may accumulate during cleaning of the spreader) to vent or drain out of the spreader lower housing. As previously discussed, the lower assembly frame 12 may include an axle fitment 28 and the spreader lower housing 50 may include axle fitment 52. The respective fitments may be configured such that the at least two wheels 30 may be coupled via the at least one axle 32. The lower assembly frame 12 may be long enough to extend outwardly in front of the spreader lower housing and serve as an upright stand 16.

FIG. 8 depicts a perspective view of the spreader device with removable cartridge 100 engaged. Cartridge 100 may include a container 104 and a fitment 110 (as shown in FIG. 9). The container may be a bag or another type of receptacle. The container 104 may be configured such that a cartridge fitment 110 may be sealed to or otherwise fitted onto one end of the container 104. In some embodiments, the container 104 may be attached to the fitment 110 via heat welding or sealing, an adhesive, ultrasonic welding or sealing or other appropriate attachment technique or material. The container 104 may be constructed of any number of materials, and may comprise a single layer or multiple layers. For instance, the container layers may include low, medium or high density polyethylene, polyester, polyamide, polypropylene, or other like or appropriate material. As a non-limiting example, the container may include a polyester layer, a metalized polyester layer, and a layer of low density of polyethylene. The cartridge may be made of various other flexible, rigid, or semi-rigid materials.

Figure 18A:
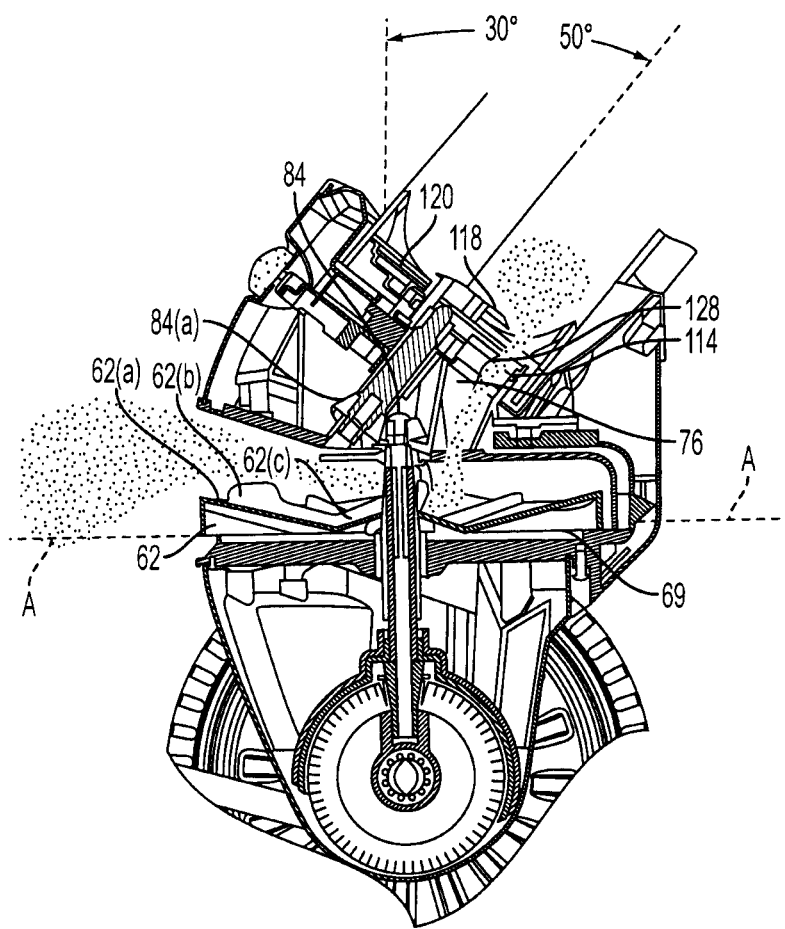
FIG. 18(a) depicts a close-up cross sectional view of the spreader lower housing with the cartridge engaged and illustrates the flow of granular product out of the cartridge, according to an embodiment of the systems and methods described herein.

As shown in FIG. 8, the cartridge 100 may be attached to cartridge hanger 24 via the container attachment opening 102 to provide additional stability for the cartridge during use. The cartridge 100 may be in an unactivated state when initially engaged with the cartridge station 70. That is, the shut-off plate 120 (shown in FIG. 11) may be positioned to block the flow of granular product out of the container 104. In addition, the cartridge 100 may also be in an unlocked state (e.g., the cartridge locking switch 72 is in the unlocked position, as shown in FIG. 8) when initially engaged with the cartridge station 70. The cartridge may be locked and/or activated using various controllers on the spreader device. Once the cartridge is activated—by squeezing or actuating controller 20, for example—product may be permitted to flow from the cartridge down through the granular chute 76 (as shown in FIG. 18(a), for example) and onto the granular product launching plate 62 where the individual granular pieces may be launched in a predetermined swath in front of the spreader device. Similarly, by moving the cartridge locking switch 72 to the locked position, the cartridge 100 may be locked securely within cartridge station 70.

FIG. 9 depicts the cartridge bag 104 divorced from the cartridge fitment 110. The container 104 and fitment 110 may be jointly configured so that the fitment may be sealed to or otherwise attached to one end of the cartridge container 104. Thus, the face 112 of the cartridge fitment (i.e. the face 112 that is visible as illustrated in FIG. 9) may be disposed on the inside of the container such that it is not otherwise visible to the user when the fitment 110 is attached to one end of the container 104. In some embodiments, the bottom of the fitment 110 is approximately flush with the container 104 so that fitment 110 is almost not noticeable when cartridge 100 is view from a side perspective.

As shown in FIG. 9, cartridge fitment 110 may include an agitator 118 which may rotate in accordance with the rotation speed of the granular product launching plate (not shown) to agitate product inside the container. The action of the agitator 118 may help ensure even product flow. The agitator 118 may rotate inside the container itself. In other words, the agitator may be on the container side of the fitment. The cartridge fitment may also include a metering plate 116, which may further include a metering gate 114 of predetermined size. In some embodiments, the size of the metering gate 114 may be predetermined based on the type of product in the container 110. For example, some product may have an appropriate flow rate that differs from other products and a smaller or larger metering gate 114 in the metering plate may therefore be appropriate.

Figure 9A:
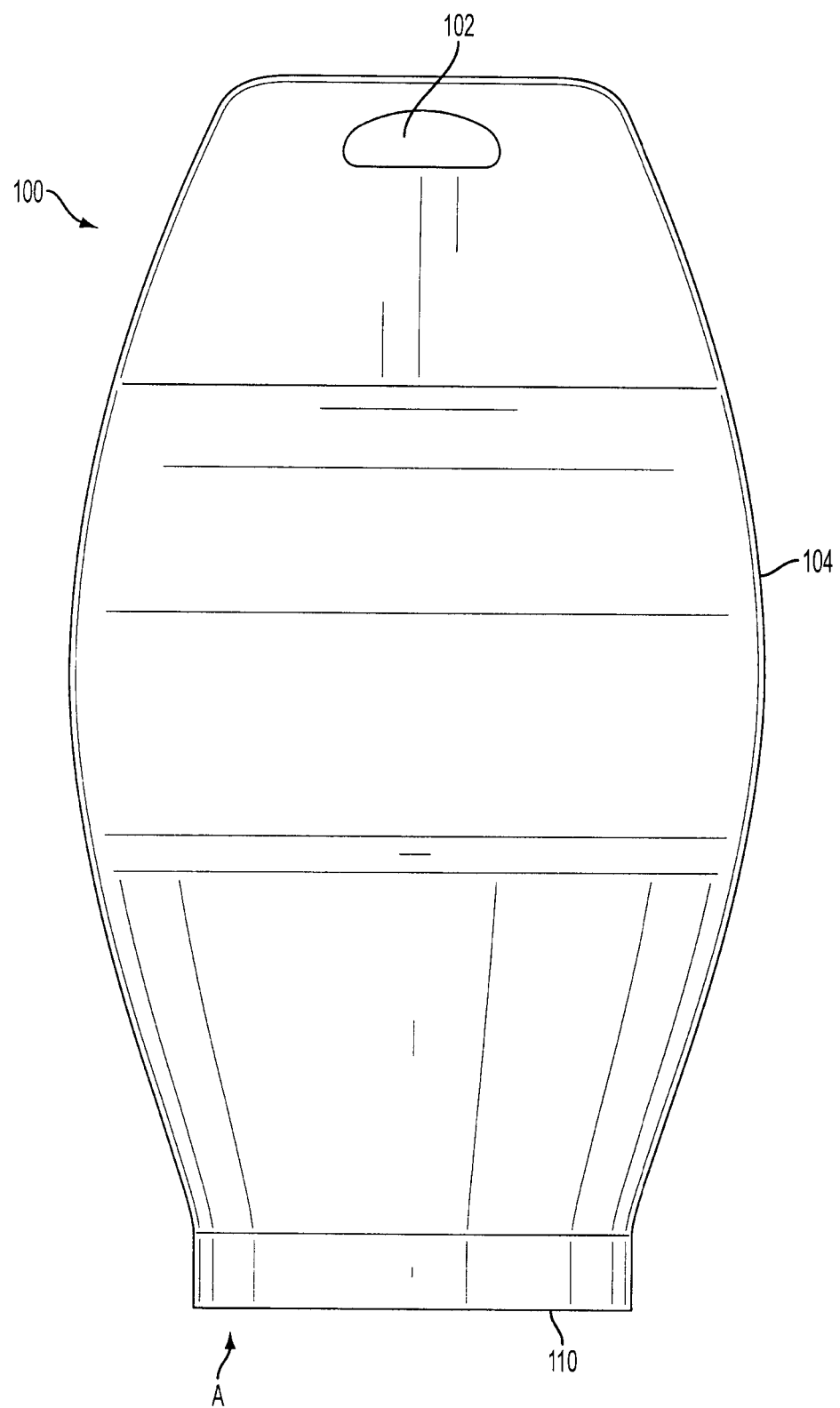
FIG. 9(a) depicts a side view of the cartridge with fitment attached to the container, according to an embodiment of the systems and methods described herein.

FIG. 9(a) depicts a side view of cartridge 100. The cartridge 100 may include a container 104 which may hold various varieties of granular product. The cartridge 100 may include a container attachment opening 102 which may be attached with a container attachment handle (which is illustrated, for example, in FIG. 4(a)). Cartridge 100 may also include fitment 110, which may be configured to engage with a cartridge station and dispense granular product to a launching plate where it may be launched or impelled across terrain or other surfaces. Fitment 110 may be affixed with container 104 such that the cartridge 100 is a single entity. The fitment 110 may be affixed to container 104 by various means, including by way of non-limiting example, heat weld, ultrasonic welding, use of various adhesives, or other like or appropriate material or techniques.

Figure 10:
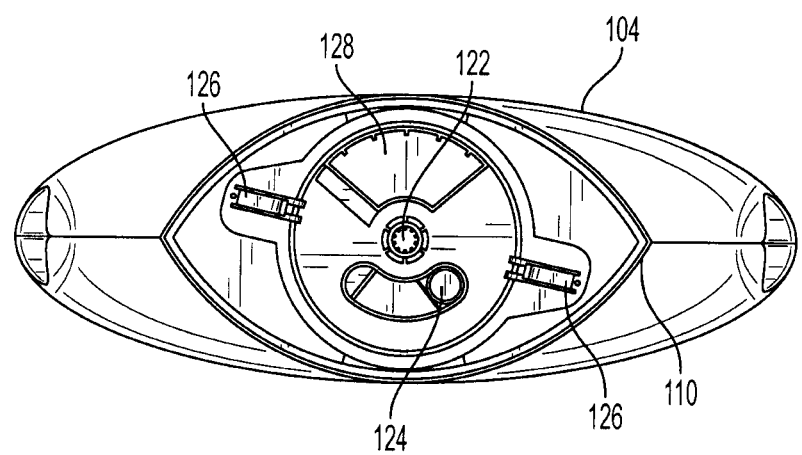
FIG. 10 depicts a bottom plan view of a product cartridge, particularly showing a fitment component which engages a spreader body, according to an embodiment of the systems and methods described herein.

FIG. 10 depicts a bottom plan view of a flexible or rigid product cartridge which has been attached to a fitment 110 configured to engage with a cartridge station 70 (e.g. the view shown by the arrow "A" in FIG. 9(a)). The cartridge fitment 110 may be configured such that the fitment 110 mechanically engages with the cartridge station 70. For example, the agitator driver 80 (as shown in FIG. 5) may become mechanically engaged in a mating shape or keyed fashion with the agitator drive shaft 122 on the cartridge fitment 110. As such, the agitator drive shaft of 122 may rotate as the spreader is pushed by a user. Further, the product conveyor 128 may fit geometrically within or around the granular chute 76 (shown in FIG. 5) on the cartridge station 70. In this way, product flowing out of container 104 and into the spreader may do so through a securely defined flow path. Additionally, the cartridge activator 78 on the cartridge station 70 may be configured to engage or mate with and rotate the shut-off plate 120 (as shown in FIG. 11) at the activation slide 124 of the cartridge fitment. In some embodiments, activation slide 124 is attached to shut-off plate 120 so that movement of activation slide 124 results in rotational movement of the shut-off plate 120, which in turn enables the selective opening and blocking of the product flow path out of the container 104. Indeed, rotation of the shut-off plate 120 may constitute activation and deactivation of the cartridge.

In some embodiments, fitment 110 may include locking features 126 which are geometrically aligned with cartridge stabilizers 82 on the cartridge station 70. Such matching geometric features may allow for the cartridge to easily engage with the cartridge station and then become locked into place. In some embodiments, the locking action may result from stabilizing engagers 83 (which are associated with the cartridge stabilizers 82) being inserted into the locking features 126 to ensure a tight and secure attached of the cartridge 100 to the cartridge station 70. In some embodiments, stabilizing engagers 83 may be selectively moved by a user via locking lever 72. In addition, once the cartridge 100 is locked in place, a user may selectively activate and deactivate product flow out of the cartridge and into spreader. When the cartridge is de-activated (e.g., when the user releases controller 20), product from the cartridge may be prevented from flowing out of the cartridge. The cartridge 100 may then be removed without product spilling from the cartridge. FIG. 11 depicts the various layers of the cartridge fitment 110 as seen from the top or inside face of the cartridge fitment 110. The cartridge fitment 110 may include a fitment shell 112, which may be configured to engage with the cartridge station 70 such that the cartridge is stable within the spreader and so that product can flow from the container down to the product launcher plate 62.

In some embodiments, the cartridge fitment shell 112, as well as the other components depicted in FIG. 11, may be made of a metallic material, high-density polyethylene material, polypropylene material, polyamide material, rigid or semi-rigid polyolefinic material, or any other another like or appropriate material. Each component of the fitment 110 will now be described. The cartridge fitment may include an agitator 118, which may rotate in accordance with the rotation of wheels to agitate product inside the container. In some embodiments, agitator 118 may be connected to agitator driver 80 (as shown in FIG. 1a), which in turn is connected to gearbox 34. In this way, agitator 118 may rotate as the spreader is pushed by a user. Rotation of the agitator may help prevent clogging, bridging and/or clumping of product within the container. While FIG. 11 depicts fitment 110 and its constituent components in isolation, it may be appreciated that the components shown in FIG. 11 are all within the interior of the container and thus not visible to the consumer during normal use and operation.

Fitment 110 may also include a metering plate 116. The metering plate may include a metering gate 114 of predetermined size and tabs 116a. The size of the metering gate 114 may be predetermined based on the type of product in the container. For example, some product may flow more easily than other types of product and a smaller metering gate 114 in the metering plate may therefore be appropriate. The size of the metering gate 116 is preferably dependent on the particular granular product contained in the cartridge. In some embodiments, metering plate 116 is positioned in a stationary manner within fitment shell 112 such that tabs 116a fit within openings 116b on the fitment shell 112. When so positioned, fitment 110 would appear as it does in FIG. 9.

Fitment 110 may also include a shut-off plate 120. The shutoff plate 120 may rotate in conjunction with user activation as described herein. In particular, the shutoff plate 120 may be shifted, rotated, or otherwise moved such that the chute 128, the metering gate 114 in the metering plate 116 is aligned with the open portion of the shut-plate (and product is able to flow), or the metering gate is covered up and the cartridge is therefore sealed. The shutoff plate 120 may be rotated on and off with a trigger device, such as controller 20 (as shown in FIG. 1, for example.) Such a trigger device, for example, may be included at the handlebar of the spreader device, or any other convenient location. In some embodiments, fitment 110 may also include a spring 130 which may pre-load the shutoff plate 120 in the off or sealed position such that the metering plate metering gate 114 is covered up and product can not flow out of the container. Upon user activation of controller 20, however, the spring may be compressed by the movement of shutoff plate 120 in an open position thus permitting the flow of product from the container and into the spreader.

The cartridge fitment 110 may engage with the cartridge station 70 in a variety of manners. For example, the fitment 110 may engage mechanically with the cartridge station 70. In some embodiments, it could also engage with the cartridge station through a membrane puncture mechanism, or through a temporary sealing device, for example.

Figure 12:
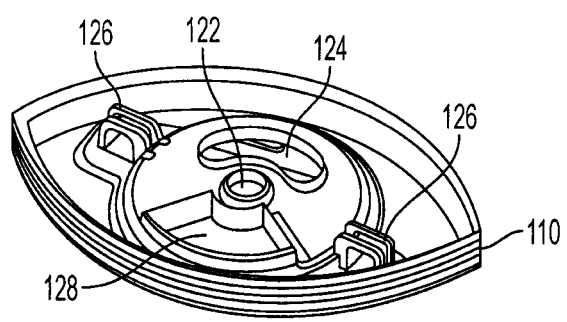
FIG. 12 depicts a bottom view of the cartridge fitment, according to an embodiment of the systems and methods described herein.

FIG. 12 depicts a perspective view of the side of fitment 110 that engages with the cartridge station 70. The features described in the discussion of FIG. 10 are also shown in FIG. 12. The FIG. 12 illustration provides a perspective view which better illustrates an embodiment that includes locking features 126 that may be configured to geometrically engage with the cartridge station and its locking mechanism.

Figure 13:
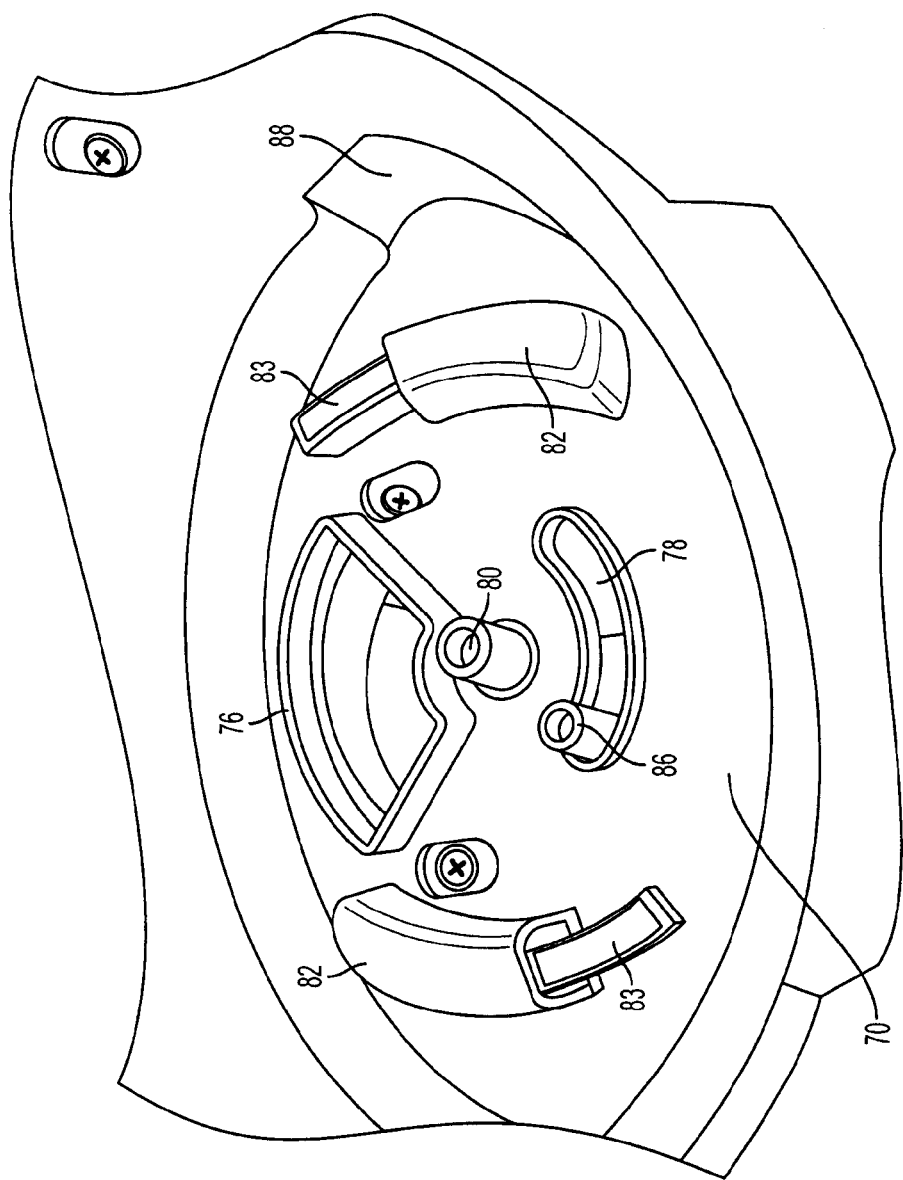
FIG. 13 depicts the cartridge station with the cartridge locking mechanism in the locked or stabilized position, according to an embodiment of the systems and methods described herein.

FIG. 13 depicts the cartridge station 70 with the cartridge locking mechanism in the locked or stabilized position. The cartridge station may include granular chute 76, which may allow granular product to flow downward to the granular product launcher. In some embodiments, the cartridge station may include cartridge activator 78 which may include an activator knob 86 which may be configured to move back and forth in the slider slot 79. The activator knob 86 in the cartridge activator 78 may be configured to engage an activator slide 124 on the cartridge fitment to permit the movement of the shutoff plate 120 (as shown in FIG. 10) in the fitment 110 of the cartridge 100 as described herein.

In some embodiments, the cartridge station 70 may include agitator driver 80, which may drive the cartridge agitator 118. The cartridge station 70 may include container edge seam details 88, which may allow the cartridge fitment clearance to easily engage with the cartridge station. The cartridge station may include cartridge stabilizer 82, which may engage with the cartridge fitment 110. Cartridge stabilizer 82 may include rotatable stabilizing engagers 83. In this figure, rotatable stabilizing engagers 83 are illustrated in the locked or stabilized position. In some embodiments, the positioning of engagers 83 may be controlled by the position of locking device 72.

Figure 13A:
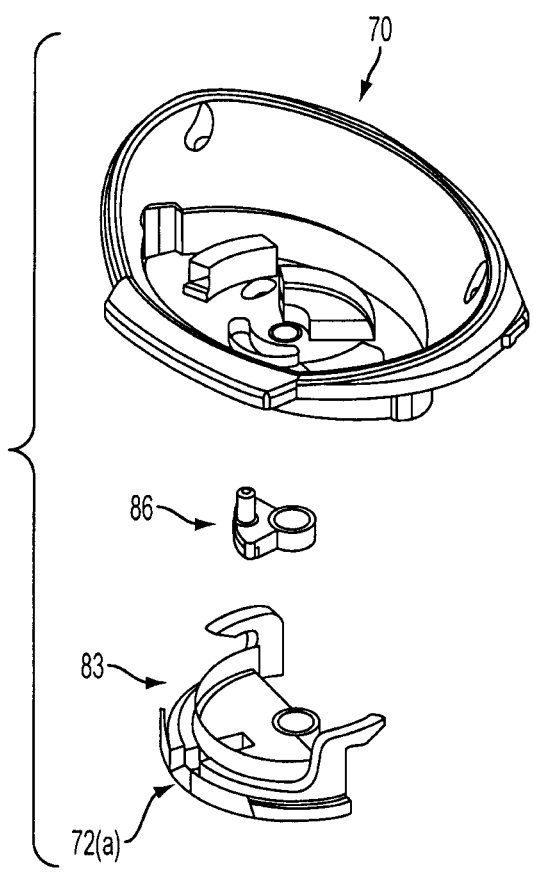
FIG. 13(a) depicts various components of the cartridge station, according to an embodiment of the systems and methods described herein.

FIG. 13(a) illustrates various components of the cartridge station. Specifically, FIG. 13(a) illustrates individual components of the cartridge station 70, which were described above with respect to FIG. 13. The activator knob 86 and engagers 83 may be configured to rotate about the same axis as the agitator driver 80 (as shown in FIGS. 5 and 18a, for example). Engagers 83 may be rotated using switch 72 which may be received in slot 72(a).

Figure 13B:
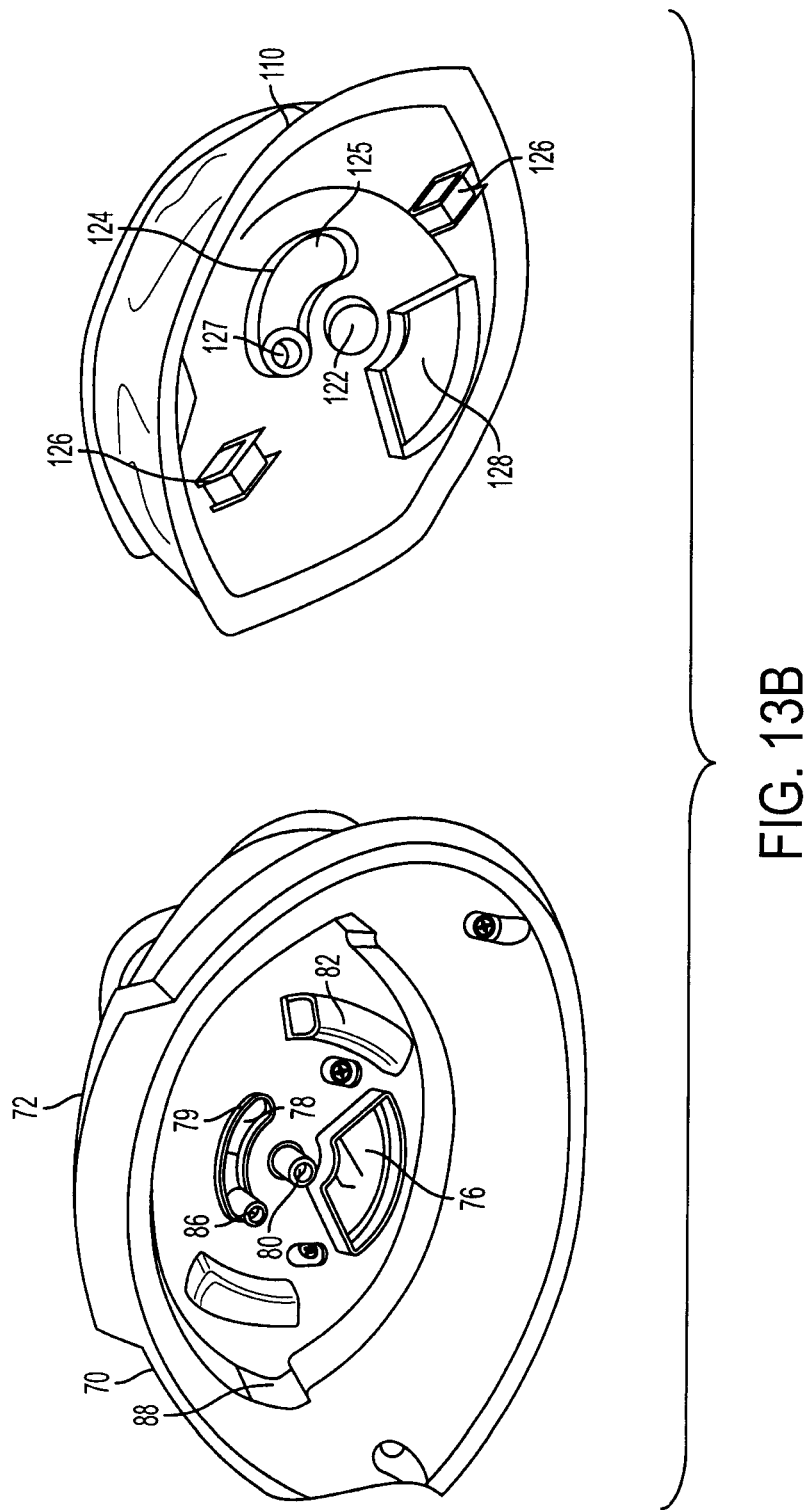
FIG. 13(b) is an illustration of both the cartridge station and the cartridge fitment, according to an embodiment of the systems and methods described herein.

FIG. 13(b) is an illustration of both the cartridge station 70 (on left) and the cartridge fitment 110 (on right). This illustration provides a visual indicator of how the cartridge fitment 110 engages with the cartridge station 70. As shown, the cartridge fitment 110 may be shaped in a like manner as cartridge station 70 so that they fit together in a tight and secure manner. Further, the fitment 110 and the cartridge station 70 may connect in several spots. For example, the agitator driver 80 of the cartridge station 70 may fit within the agitator drive shaft 122. The two may be configured such that rotation of the agitator drive 80 causes the agitator 118 (as shown in FIG. 11, for example) to rotate. Thus, the agitator driver 80 and the agitator drive shaft 122 may be configured to fit together physically as well as functionally.

The granular chute 76 may connect with the granular product conveyor 128. When granular product flows out of the conveyor 128, it flows directly through the granular chute on its way down to the granular product launcher. The chute and the conveyor may be configured such that they fit together geometrically. This may allow additional stabilization for the engaged cartridge. It may also allow for a sealed passageway for the granular product to flow from the cartridge down to the granular product launcher.

Cartridge stabilizers 82 may be configured to align with locking features 126. This alignment may allow the stabilizing engagers (which are not illustrated in this figure, but are shown in described with respect to FIG. 13) to engage the locking features 126 and thereby lock the cartridge in a secure stable position. The stabilizing engagers may be controlled by the locking lever 72.

The cartridge station 70 may include a cartridge activator 78, which may shift back and forth at the control of the user. Cartridge activator 78 may include an activator knob 86 which may be shifted or rotated within activator channel 79. The cartridge fitment 110 may include an activation slide 124 which may be slid or shifted to activate or deactivate the flow of granular product out of the cartridge. Activation slide 124 may include a slide engager 127 and an activation slide channel 125. The activator knob 86 may be configured to engage with the slide engager 127 such that the user-controlled movement of the knob controls the movement of the activation slide 124 within the activation slide channel 125. Further, activator channel 79 and activation slide channel 125 may be configured to fit together geometrically so as to add additional stability to the cartridge when it is engaged with the cartridge station. Cartridge station 70 may also include edge seam details 88. Edge seam details 88 may be configured to geometrically align with the corners of cartridge fitment 110. This may provide for further stabilization when the cartridge is engaged with the cartridge station 70.

Figure 13C:
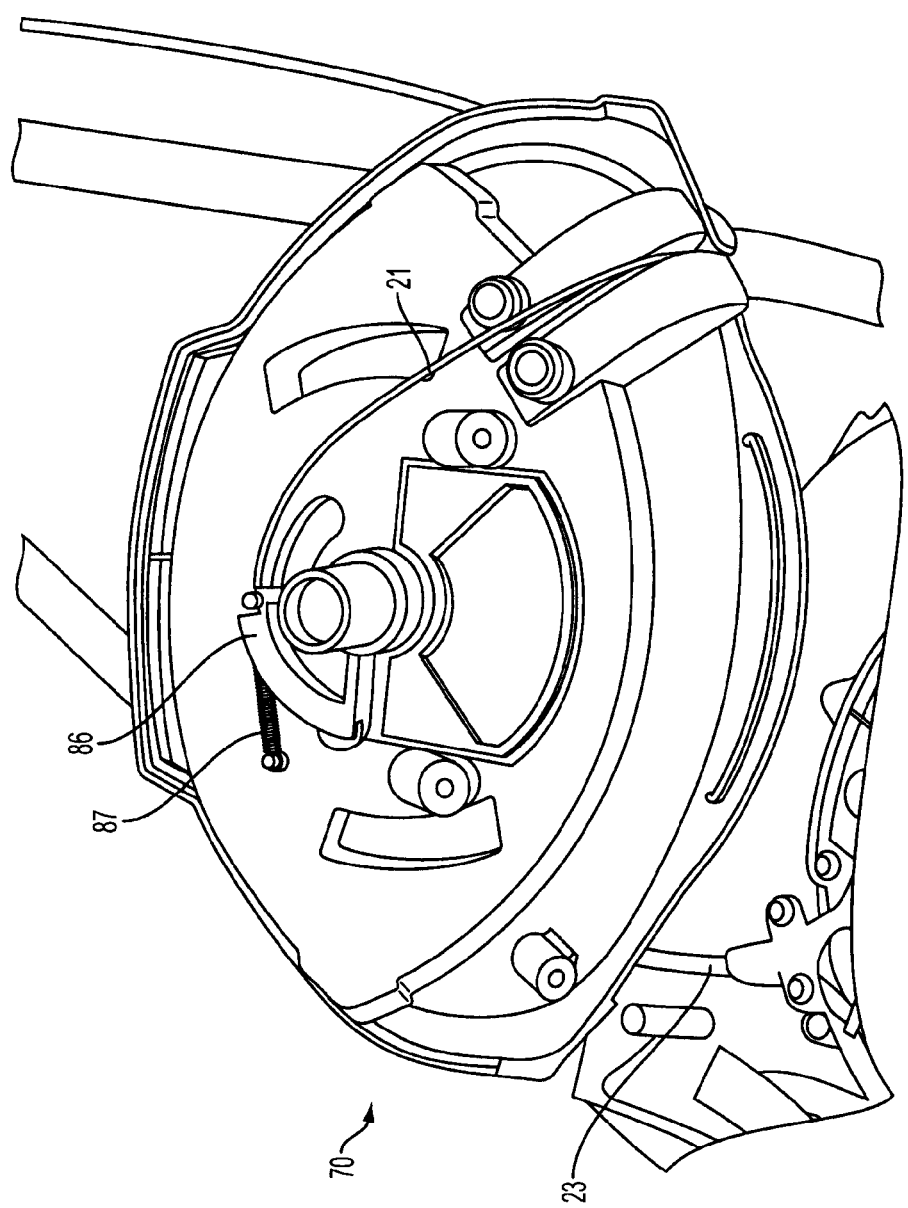
FIG. 13(c) depicts a view of the bottom side of the cartridge station, according to an embodiment of the systems and methods described herein.

FIG. 13(c) depicts a view of the bottom side of the cartridge station 70. An activator controller cable 21 may be linked with the activator spring 87 to control the activator knob 86, which may be spring loaded such that the default position is an off position. An edge guard controller cable 23 may be functionally linked to the edge guard 66 (shown in FIG. 21, for example). Accordingly as the user activates controller 20, for example, the cable 21 transfers movement to activator knob 86 which controls the opening and closing of the product flow path from the container to the spreader.

Figure 14:
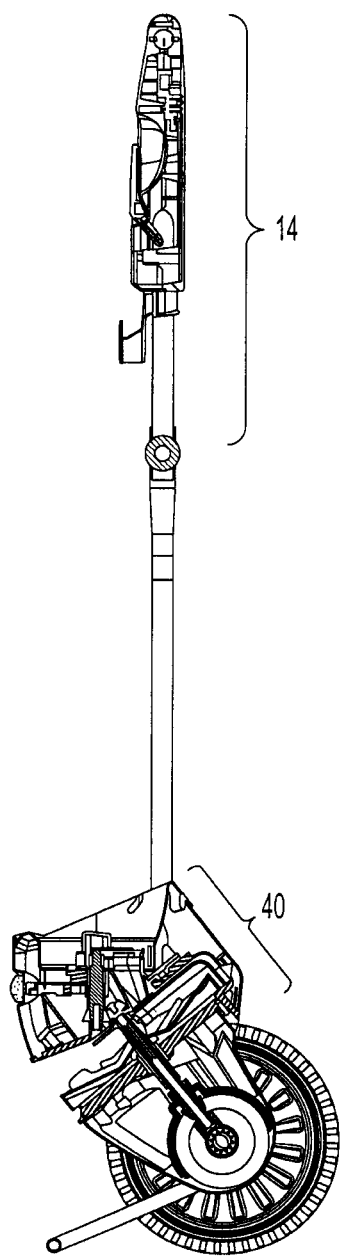
FIG. 14 depicts a cross sectional view of the cartridge spreader without the cartridge engaged, according to an embodiment of the systems and methods described herein.
Figure 15:
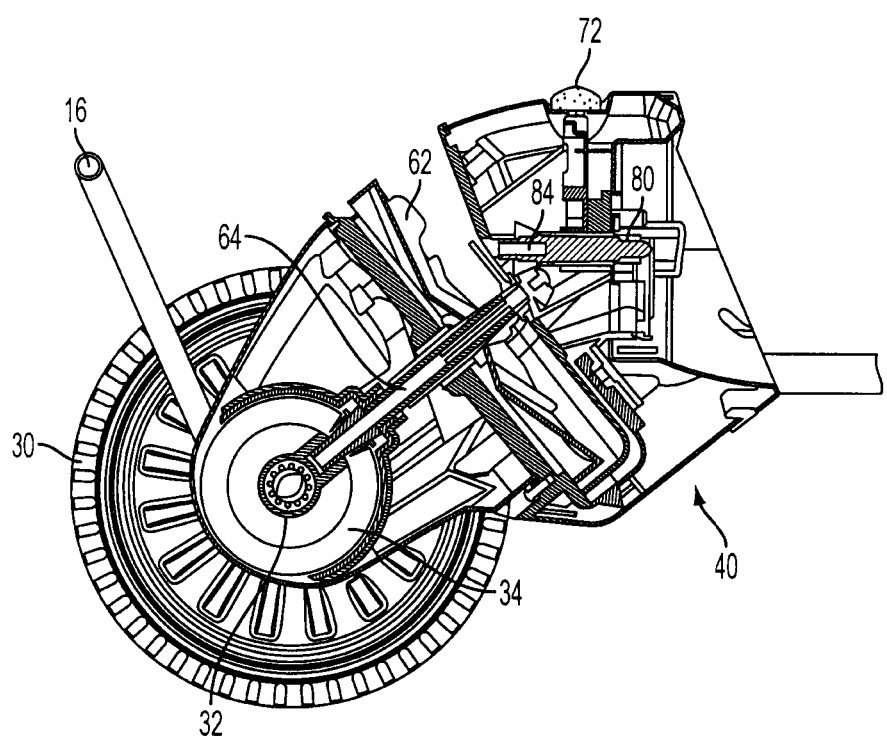
FIG. 15 depicts a close up cross sectional view of the spreader lower housing without the cartridge engaged, according to an embodiment of the systems and methods described herein.

FIG. 14 depicts a cross-sectional view of the cartridge spreader without the cartridge engaged. The cross-sectional view will be described in more detail with respect to FIG. 15, which illustrates an up close cross-sectional view of the spreader body 40. In particular, FIG. 15 depicts a close-up cross-sectional view of the spreader body 40 without the cartridge engaged. At least one wheel 30 turns an axle 32 which in turn rotates the gearbox 34 that the axle 32 is coupled with. The gearbox rotation causes the launching plate 62 to launch, throw, impel or broadcast granular product in front or to the sides of the spreader device. At the end of the drive shaft 64 emanating from the gearbox is a bevel gear 84, which is rotatably coupled with the agitator driver 80. The agitator driver 80 drives the cartridge agitator 118 once the cartridge fitment is engaged with the cartridge station. Thus, the launching plate and cartridge activator may continuously rotate in conjunction with each other. Locking lever 72 is also illustrated in FIG. 15.

Figure 16:
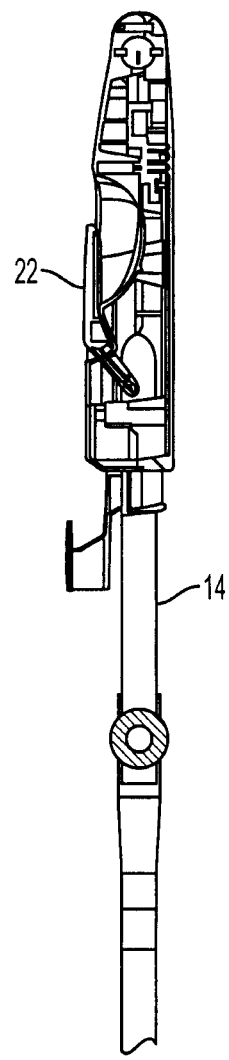
FIG. 16 depicts a close-up cross sectional view of the handle assembly without the cartridge engaged.

FIG. 16 depicts a close-up cross-sectional view of the upper handle assembly 14. In some embodiments, the handle assembly may include internal components which may work in conjunction with edge guard controller 22 and activator controller (not pictured). Thus, when a user pulls forward the edge guard controller, the internal components may be configured to cause the edge guard 66 to rotate. Further, when a user pulls the activator controller 20, the internal components may cause the activator controller 20 at the cartridge station to slide, shift, rotate or otherwise move the shutoff plate 120 in the cartridge fitment 110 (as shown in FIG. 11) to the actuated or operational position. Releasing the activator controller 20 may allow the activator to slide, shift, rotate, or otherwise move into the closed position in which flow of product is blocked. In some embodiments, there may be a physical linkage between the controllers at the upper frame assembly 14 and the components controlled at the spreader body.

Figure 16A:
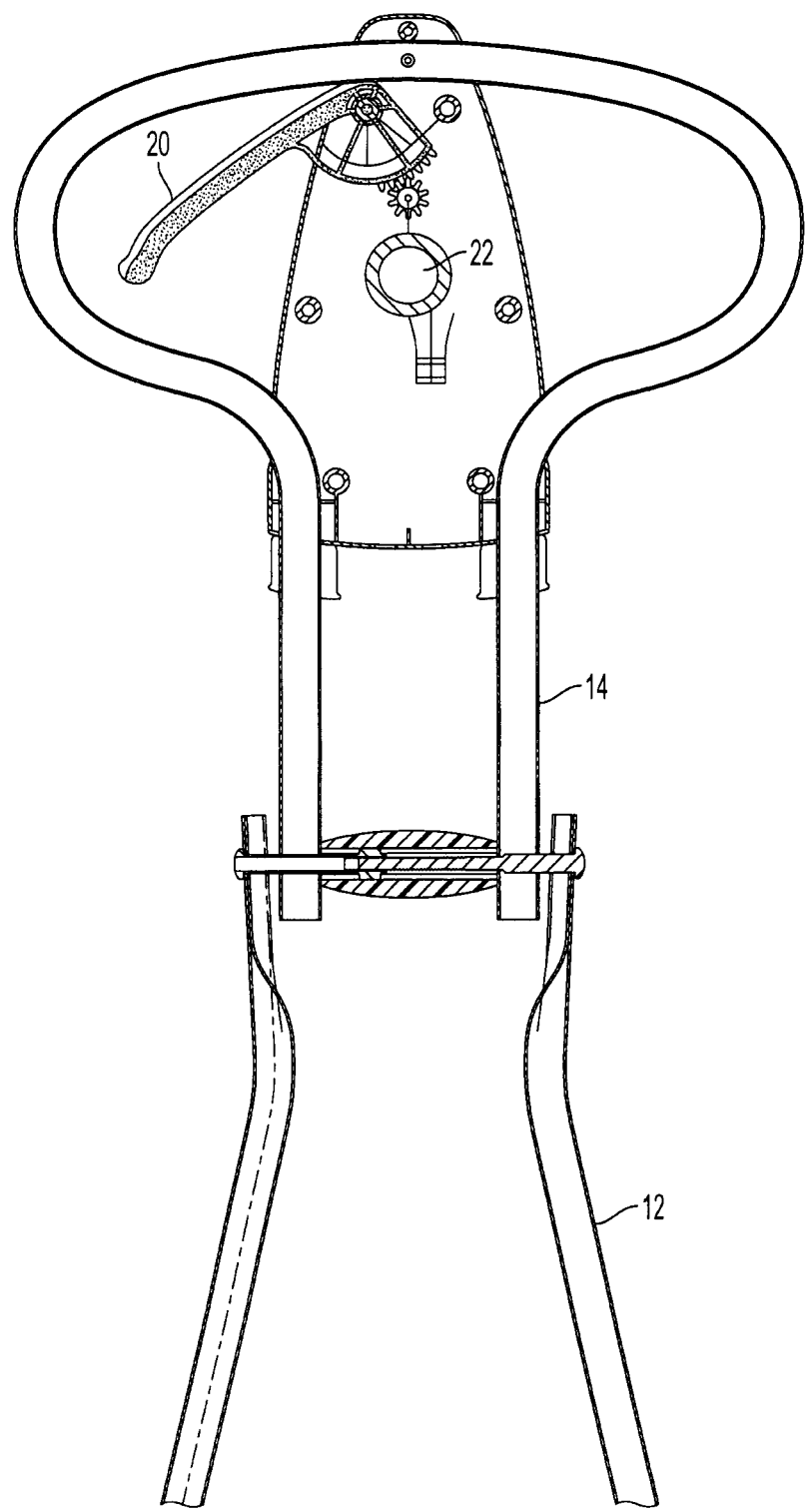
FIG. 16(a) depicts a detailed front view of the upper frame assembly, according to an embodiment of the systems and methods described herein.

FIG. 16(a) depicts a detailed cross-sectional front view of the upper frame assembly 14. The upper frame assembly 14 may include an activator controller 20. In some embodiments, the activator controller is a lever in the upper frame assembly 14, which may include a gear ratio that magnifies the applicator lever movement to obtain a larger movement of the shut-off plate movement, so the lever travel for the consumer is less. This motion from the top application lever may be transferred through a sheathed cable down to the lower assembly and specifically the shutoff plate 120. It should be appreciated that this type of activator controller is described in an exemplary manner, and other possible controllers and controlling techniques are possible. For example, the activator controller 20 may control the activator through various manual or electro-mechanical devices or means.

In some embodiments, the edge guard controller 22 may control movement of the edge guard 66 through a sheathed cable which rotates the edge guard 66 around the launcher assembly. Again, it should be appreciated that this type of edge guard controller is described in an exemplary manner only. For example, the edge guard controller 22 may control the edge guard through various mechanical or electro-mechanical means.

Figure 16B:
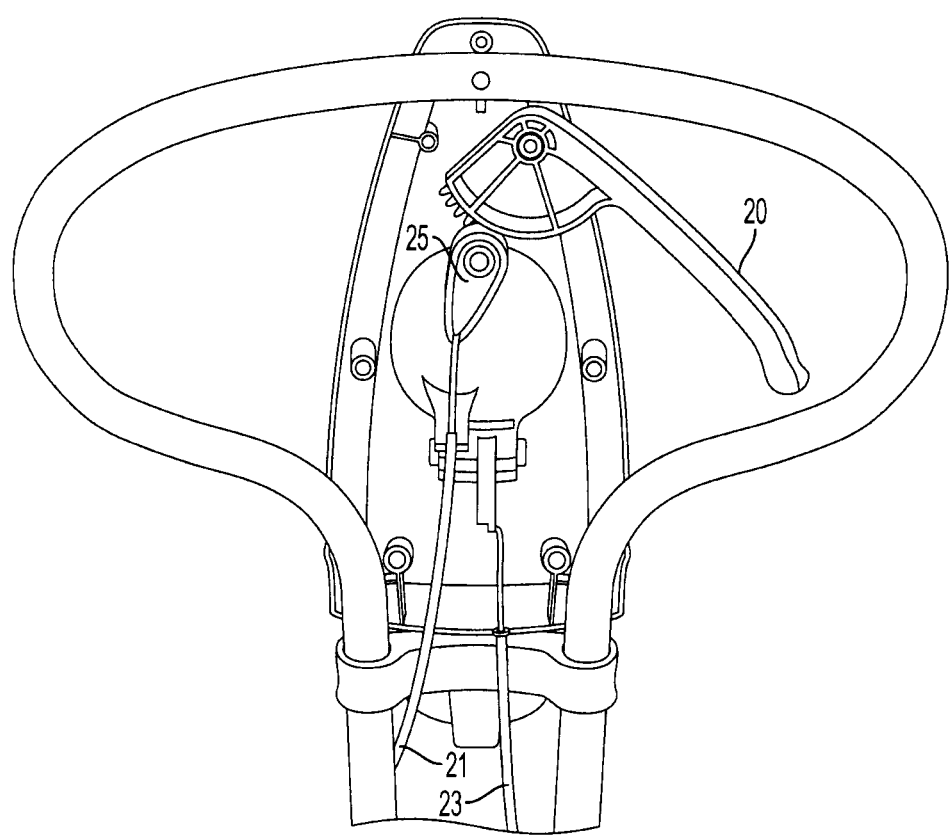
FIG. 16(b) depicts a rear view of the upper frame assembly including cables connecting from the activation controller and the edge guard controller, according to an embodiment of the systems and methods described herein.

FIG. 16(b) depicts a rear view of the upper frame assembly including cables connecting from the activation controller 20 and the edge guard controller 22. In some embodiments, an edge guard controller 22 may be functionally linked with the edge guard 66 via a cable 23. In some embodiments, an activator controller 20 may be functionally linked with the activator 78 via a cable 21. In some embodiments, the activator controller 20 may include gear link 25, which may allow for a mechanical advantage, allowing a small squeeze of the activator controller 20 to fully activate and deactivate the activator 78.

Figure 16C:
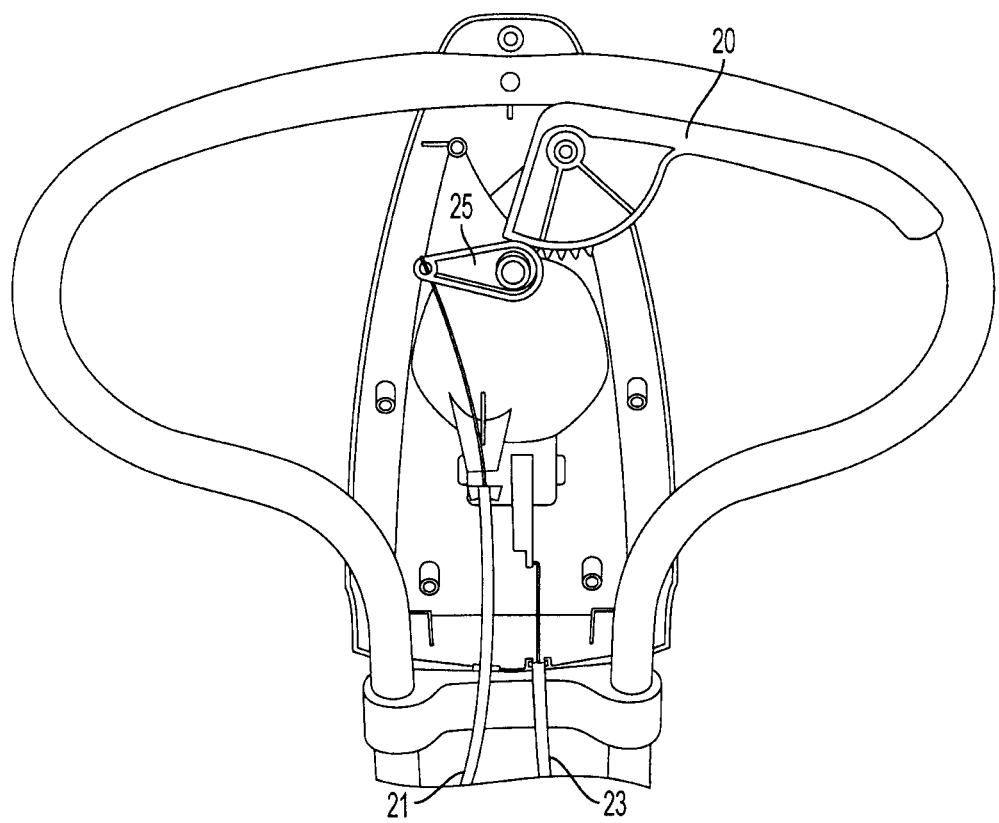
FIG. 16(c) depicts a rear view of the upper frame assembly, with activator controller 20 pulled to the "on" position, including cables connected to the activation controller and the edge guard controller, according to an embodiment of the systems and methods described herein.

FIG. 16(c) depicts a rear view of the upper frame assembly, with activator controller 20 pulled to the "on" position, including cables connecting from the activation controller and the edge guard controller. The depiction in this figure is similar to the depiction in FIG. 16(b) except that this figure shows the activator controller in the "on" position, and illustrates how a squeeze of the activator controller may cause an approximately ninety degree rotation of the gear link 25, which may act as a pull on the activator controller cable 21. A cable 23, which may connect the edge guard controller 22 to the edge guard 66, is also depicted.

Figure 17:
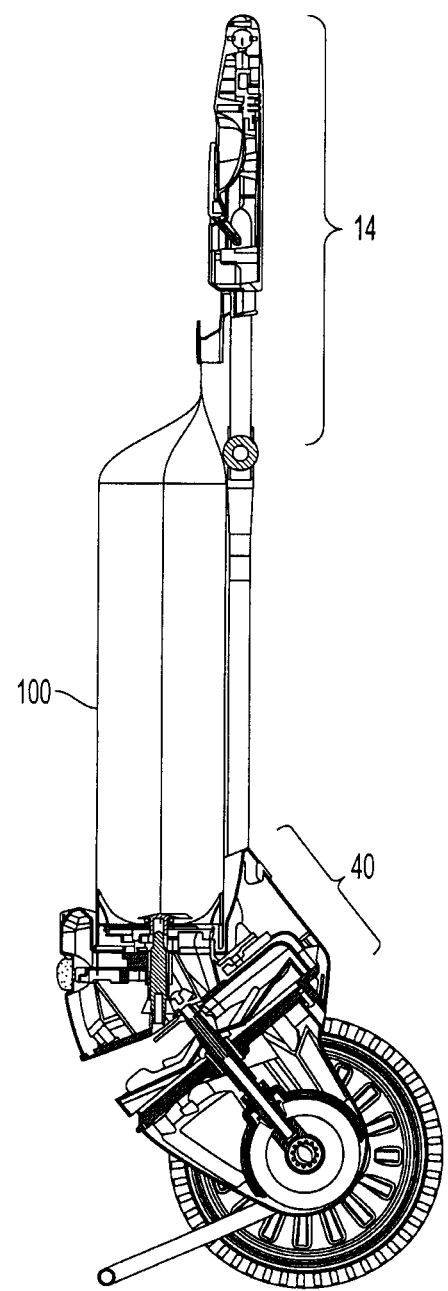
FIG. 17 depicts a cross sectional view of the cartridge spreader with the cartridge engaged, according to an embodiment of the systems and methods described herein.
Figure 19:
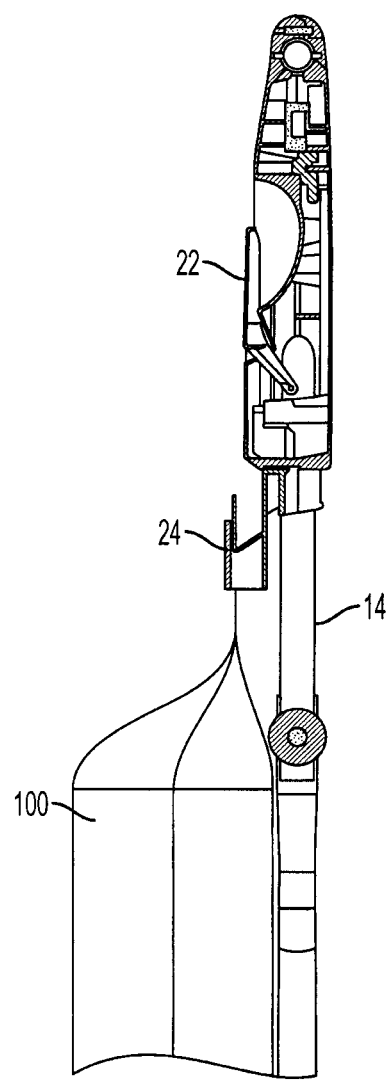
FIG. 19 depicts a close-up cross sectional view of the handle assembly with the cartridge engaged, according to an embodiment of the systems and methods described herein.

FIG. 17 depicts a cross sectional view of the spreader with the cartridge 100 engaged. The cross-sectional view will be described in more detail with respect to FIGS. 18 and 19. FIG. 18 illustrates an up close cross-sectional view of the spreader body 40. FIG. 19 illustrates an up close cross-sectional view of the upper frame assembly 14.

FIG. 18 depicts a close-up cross-sectional view of the spreader body with the cartridge engaged. The at least one wheel 30 turns an axle 32 which in turn rotates the gearbox 34 that the axle 32 is coupled with. The gearbox rotation drives the rotation of the launching plate 62, causing the launching plate 62 to launch, throw, impel or broadcast granular product in front of the spreader device. At the end of the drive shaft emanating from the gearbox is a bevel gear 84, which is rotatably coupled with the agitator driver 80. The agitator driver 80 drives the cartridge agitator 118 once the cartridge fitment is engaged with the cartridge station. Thus, the launching plate and cartridge activator may continuously rotate in conjunction with each other.

Agitated product may then flow downward to the metering plate of the cartridge fitment 110. When the activator has shifted the shutoff plate 120 such that the metering plate metering gate is not covered up by the shutoff plate 120, product may flow down to the granular chute 76 of the cartridge station and onto the launching plate 62 where the granules may then be launched across the terrain or other surface. A locking switch 72 may lock the cartridge into a stable position once the cartridge has become engaged with the cartridge station. In addition, the upright stand 16 may be configured to balance the spreader device in the resting position when the cartridge is engaged or when the cartridge is not engaged.

FIG. 18(a) depicts a close-up cross-sectional view of the spreader lower housing with the cartridge engaged and illustrates the flow of granular product out of the cartridge. During use of the spreader, the granular product in the container may be agitated by the agitator 118. If the cartridge is activated such that the shutoff plate 120 (shutoff plate 120 is illustrated more clearly in FIG. 11) is not blocking the flow of granular product, the granular product exiting the container may then flow through the metering plate 114, the product conveyor 128, down through the granular chute 76 (shown more clearly in FIGS. 13 and 21(a), for example), and onto the launching plate 62 which may rotate and thereby launch the granular product out in front of the spreader device, for example. Launching plate 62 may include outer ramp portion 62(a), inner ramp portion 62(c), and fins 62(b). The inner ramp portion 62(c) may be sloped at an angle of 10-20 degrees from the horizontal dashed line A. The slope of the inner ramp portion may help position the granules at the intersection of the inner ramp portion and the outer ramp portion 62(c) so that they might be optimally launched. Outer ramp portion 62(a) may be sloped at an angle of 25-35 degrees from the horizontal dashed line A. The outer ramp portion may help launch the granules with an initially upward trajectory. The launching fins 62(c) may function cooperatively with the outer ramp portion 62(a) to help ensure that the granular product gets launched over the wheels and in an even spread pattern distribution over terrain and hard surfaces.

FIG. 19 depicts a close-up cross sectional view of the handle assembly with the cartridge engaged. This figure illustrates the cartridge 100 attached to the container attachment 24. In some embodiments, the upper handle assembly 14 may include internal components which may work in conjunction with edge guard controller 22 and activator controller 20. Thus, when a user pulls forward the edge guard controller 22, the internal components may be configured to cause the edge guard 66 to rotate. Further, when a user pulls the activator controller 20, the internal components may cause the activator controller 78 at the cartridge station to slide the shutoff plate 120 in the cartridge fitment to the on or off position. There may be a physical linkage between the controllers at the upper frame assembly 14 and the components controlled at the spreader body.

Figure 20:
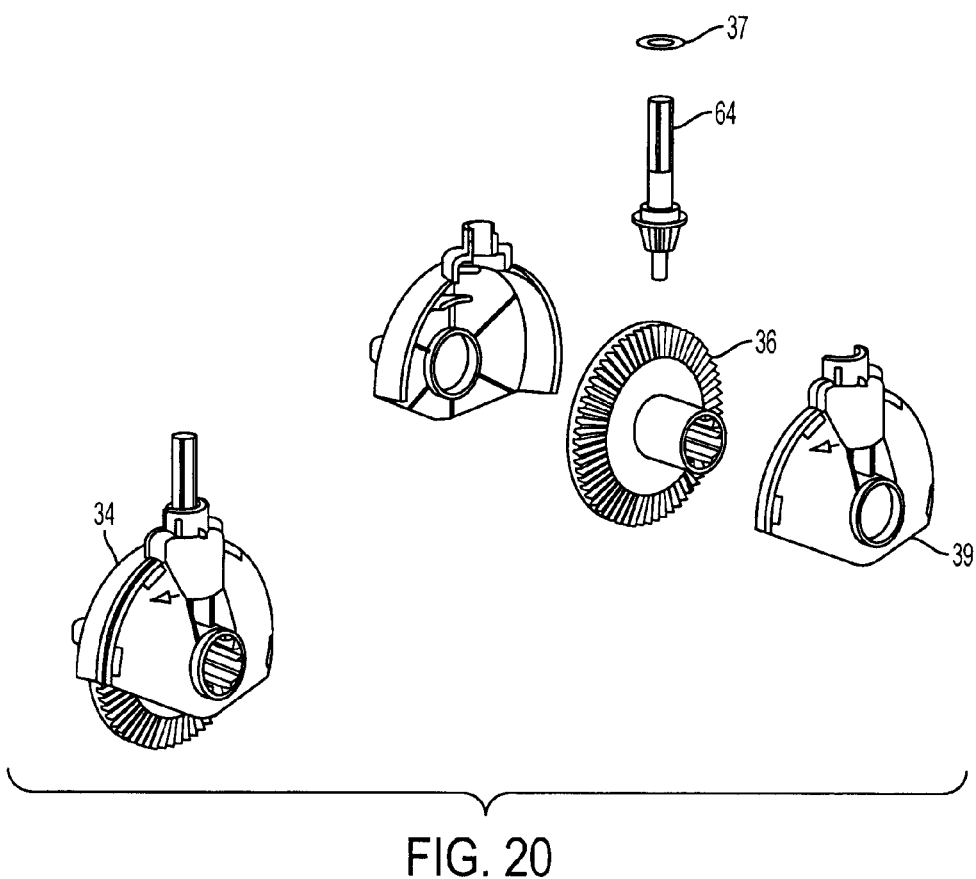
FIG. 20 depicts the gearbox, according to an embodiment of the systems and methods described herein.

FIG. 20 depicts the gearbox 34. The gearbox 34 works in conjunction with the axle, which is turned by rotation of the wheels. The gearbox components may fit inside a gearbox housing 39. The axle may include a gear connection to the gearbox 34 at the axle bevel gear 36. The axle may rotate forward in conjunction with forward motion of the wheels. The rotation of the axle may cause the forward rotation of an axle bevel gear 36 which may engage another bevel gear to rotate the launching plate spinner axis 64. A washer 37 may fit over spinner axis 64 and may act as a thrust washer which may prevent excessive wear and abrasion caused by the rotating action. The spinner axis 64 may transform forward rotation of an axle 32 (as shown in FIG. 1(*a*), for example) into counterclockwise rotation, for example, which may drive the granular launching plate 62.

Figure 21:
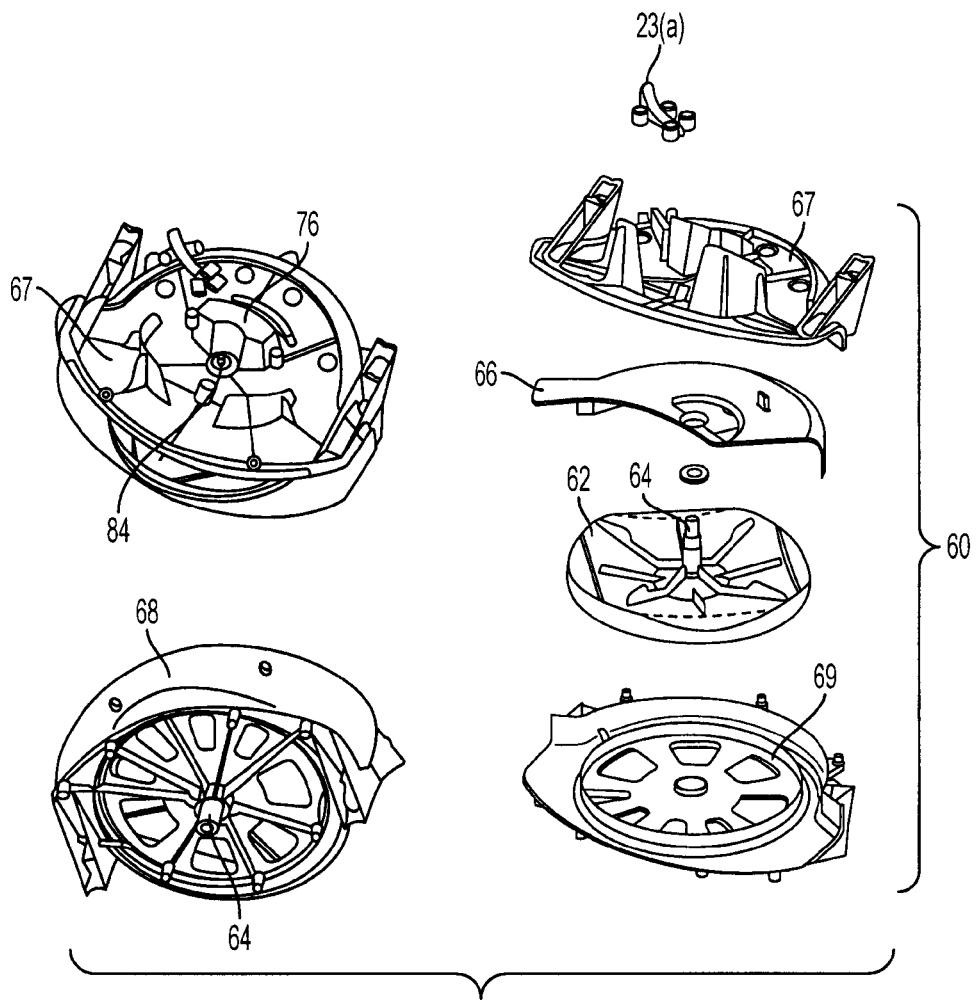
FIG. 21 depicts the granular product launcher assembly, according to an embodiment of the systems and methods described herein.
Figure 21A:
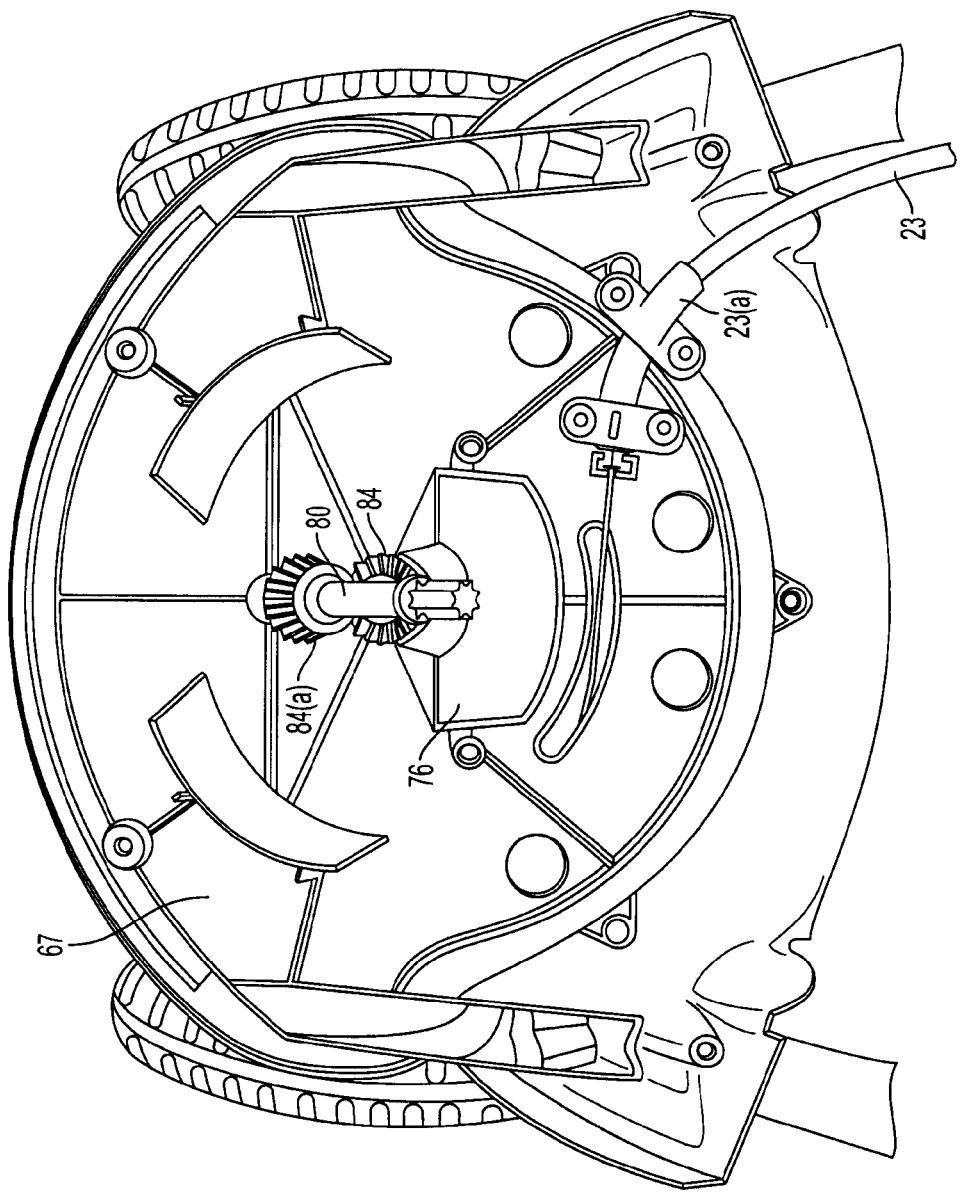
FIG. 21(a) depicts a view of the top side of the upper plate of the launcher assembly, which joins the cartridge station, according to an embodiment of the systems and methods described herein.

FIG. 21 depicts various views and components of the granular product launcher 60. The granular product launcher 60 may include a launching plate 62 driven by a spinner axis 64 in the central axis of the launching plate 62. The launcher may include a rear housing boundary to prevent granular product from flowing backward. The launcher assembly 60 may also include a rotatable edge guard boundary plate 66, which may be rotated to the side of the launcher plate to block airborne granules and thus limit the angle of distribution of the granular product intentionally. The operation of edge guard boundary plate 66 is described in detail in U.S. Pat. No. 6,616,074, which is hereby incorporated by reference in its entirety.

The granular product launcher assembly may also include an upper housing 67. The upper housing 67 of the launcher assembly may be the bottom face of the cartridge station 70. As a result, the spinner axis 64 may be able to connect to the agitator driver 80 through agitator bevel gear 84. The spinner axis 64 may be able to cause rotation of the agitator driver 80. The granular chute 76 of the cartridge station may allow for granular flow onto the spinning granular launching plate 62.

FIG. 21 also illustrates how the upper housing 67, which is the bottom of the cartridge station 70, and bottom piece 69 join together with a shared rear housing 68 to surround the launching plate 62 and edge guard 66 which may prevent product from being launched backwards onto the user of the device. Edge guard controller cable guide 23(*a*) (also shown in FIG. 21(*a*)) may help affix and guide the edge guard controller cable (illustrated, for example, in FIG. 21(*a*)) to the upper housing 67.

FIG. 21(*a*) depicts a view of the top side of the upper plate of the launcher assembly 60, which joins the cartridge station 70. This view illustrates how an edge guard controller cable 23 may link with the spreader to cause the edge guard 66 to shift on and off. This view also illustrates the granular chute 76 which may engage with the cartridge station 70. This view also illustrates the agitator driver 80, and the agitator bevel gear 84, which may cause the rotation of the agitator driver 80. Edge guard controller cable guide 23(*a*) may help affix and guide the edge guard controller cable 23 to the upper housing 67 of the granular product launcher.

Figure 22:
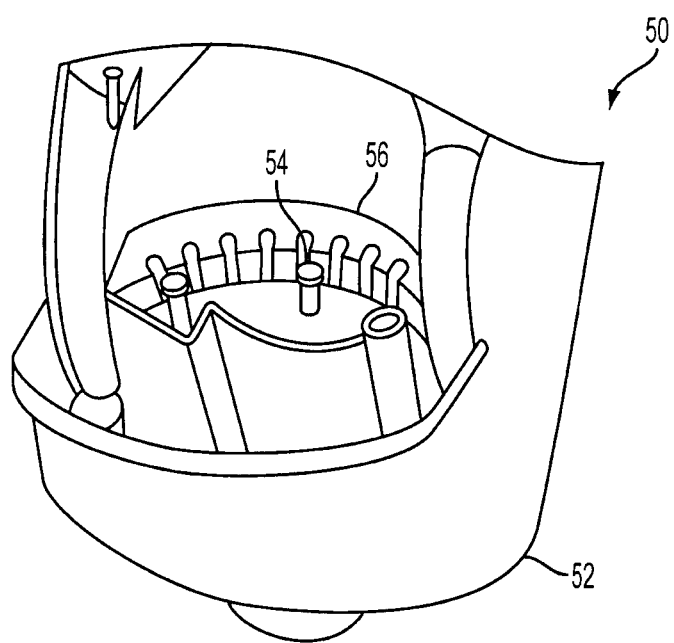
FIG. 22 depicts the lower housing of the spreader, according to an embodiment of the systems and methods described herein.

FIG. 22 depicts the lower housing 50 of the spreader. The spreader lower housing may include clearance holes for an axle 32, a rear panel 56 which extends up to the cartridge station, and ventilation holes 54, which ensure that product does not build up along the walls of the spreader body. Clearance hole 52 is not visible in this figure, but is shown with respect to FIG. 3.

Figure 23:
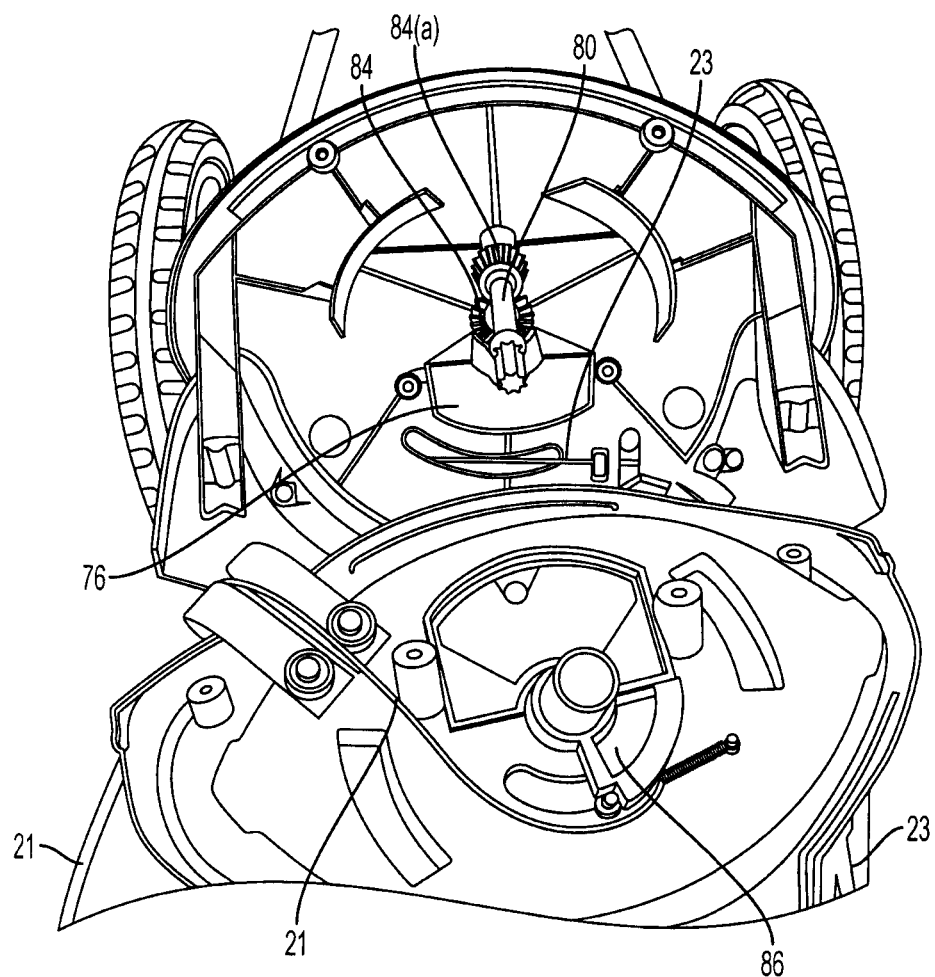
FIG. 23 depicts a view of the bottom side of the cartridge station and a view of the top side of the upper plate of the launcher assembly, according to an embodiment of the systems and methods described herein. These views are depicted individually in FIGS. 13(c) and 21(a).

FIG. 23 depicts a view of the bottom side of the cartridge station 70 and a view of the top side of the upper plate of the launcher assembly 60. These views are depicted individually in FIGS. 13(*c*) and 21(*a*). This view illustrates how an edge guard controller cable 23 may link with the spreader to cause the edge guard 66 shift on and off. This view also illustrates the granular chute 76 which may engage with the cartridge station 70. This view also illustrates the agitator driver 80, and the agitator bevel gear 84, which may cause the rotation of the agitator driver 80. This view also illustrates an activator controller cable 21 which may be linked with the activator spring 87 to control the activator knob 86, which may be spring loaded such that the default position is an off position.

Figure 24:
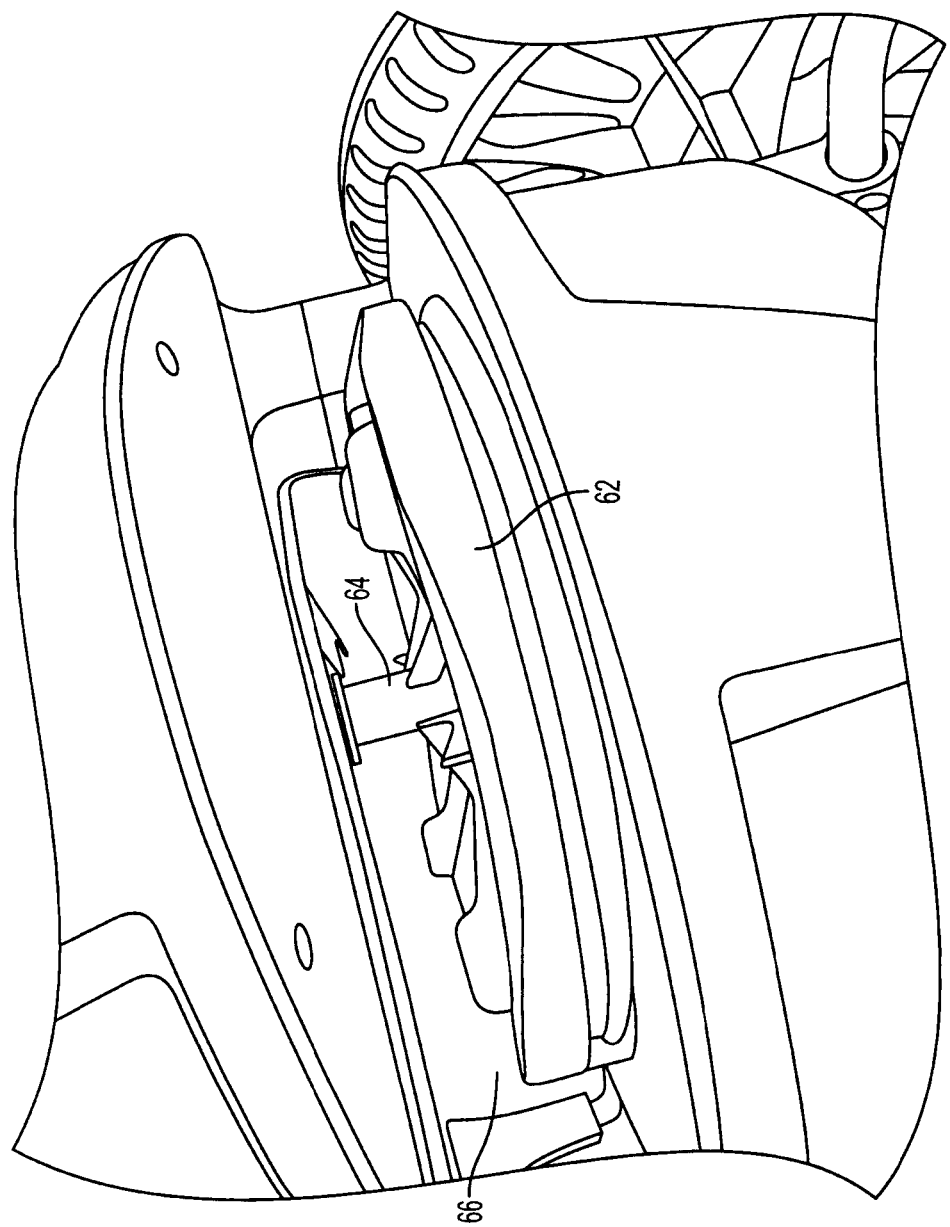
FIG. 24 is a front view of the launcher assembly which specifically depicts the edge guard feature, according to an embodiment of the systems and methods described herein.

FIG. 24 is a front view of the launcher assembly 60 which specifically depicts the edge guard 66. Launching plate 62 may be configured to rotate and thereby impel or broadcast granular product across a terrain or other surface. Edge guard 66 may be configured to rotate about spinner axis 64 and partially cover the area where granular product is broadcast from the launching plate 62. In this depiction, the edge guard 66 is in the "off" position.

FIG. 25 is a view of the granular product launcher which specifically depicts the edge guard 66 (as shown in FIG. 21, for example) rotated in an "on" position. The spreader device may be maneuvered on wheels 30 and may balance on upright stand 16 when in the resting position. Launching plate 62 may be configured to rotate and thereby impel or broadcast granular product across a terrain or other surface. Edge guard 66 may be configured to rotate partially over the launching plate thereby partially covering the area where granular product is broadcast from the launching plate 62, as described in U.S. Pat. No. 6,616,074, which is incorporated by reference herein in its entirety. In this depiction, the edge guard 66 is in the "on" position. The edge guard visual indicator 71 may allow the user of the spreader see that the edge guard is in the "on" position while maneuvering the device.

Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A mobile device for spreading, over terrain or other surface, granular product applications contained in a cartridge, the mobile device comprising:
   a granular product launcher;
   a cartridge station comprising:
     at least one cartridge engager that is configured to engage with a cartridge comprising a cartridge fitment through matching of mechanical design features on the cartridge station with mechanical features on the cartridge fitment, wherein the cartridge is removable from the at least one cartridge engager and the cartridge comprises a container, functionally joined to the cartridge fitment, for holding the granular product; and
     the at least one cartridge engager comprising:
       a locking mechanism configured to stabilize the cartridge after engagement with the cartridge station through engagement with complementary locking structures on the cartridge fitment when in a first position,
       the locking mechanism being further configured to release the cartridge in a second position; and
     a cartridge activator, configured to activate and deactivate the flow of granular product out of a cartridge; and
   an activation controller configured to control the cartridge activator and thereby control the activation and deactivation of an engaged cartridge.

2. The mobile device according to claim 1, wherein further the locking mechanism is configured to be actuated a plurality of times between the first and second positions.

3. The mobile device according to claim 1 further comprising at least one wheel for moving the mobile device over the terrain or other surface.

4. The mobile device according to claim 1, wherein the cartridge activator comprises a slide engaging abutment configured to shift about a slide activation channel that is configured to mate with a complementary structure located on the cartridge fitment.

5. The mobile device according to claim 1, wherein the mobile device, when coupled with the cartridge, is configured to allow granular product to flow at a predetermined, constant rate.

6. The mobile device according to claim 1 further comprising a frame with handlebars and an upright stand, the upright stand configured to allow the mobile device to stand upright when not in motion.

7. The mobile device according to claim 6 wherein the handlebars comprise the activation controller.

8. The device according to claim 1 wherein the granular product comprises ice melting granules, fertilizer, pesticides, granular soil amendment material, granular oil absorbent material, dusting products, granular floor cleaning product, grass seed, or combinations thereof.

9. The mobile device according to claim 1, further comprising:
a particle conveyor configured to facilitate the flow of granules from the cartridge to the granular product launcher.

10. The mobile device according to claim 1, wherein the granular product launcher is configured to distribute a granular product in a pattern over the terrain or other surface.

11. The mobile device according to claim 10, further comprising:
a rotatable arcuate plate that is configured, when in a first position, to alter the pattern of the distribution of granular product from the granular product launcher.

12. The mobile device according to claim 11, further comprising:
a second position wherein the pattern is not altered.

13. The mobile device according to claim 11, further comprising:
a visual indicator that the rotatable arcuate plate is in the first position, the visual indicator being mounted to a radially extending arm portion connected to the rotatable arcuate plate.

14. The mobile device according to claim 1, wherein the cartridge is prefilled with the granular product prior to engagement with the cartridge station.

15. The mobile device according to claim 1, the cartridge station further comprising:
an agitator drive shaft that mechanically couples to an agitator driver on the cartridge fitment.

16. The mobile device according to claim 15, wherein the agitator drive shaft, through the mechanical coupling to the agitator driver, causes an agitator to rotate within the cartridge when the mobile device is in motion.

17. The mobile device according to claim 4, wherein the cartridge activator activates a flow meeting gate on the cartridge fitment to open or close an opening on the cartridge fitment, that, when the flow metering gate is open allows the granular material to flow out of the cartridge and the flow metering gate is configured to allow flow at a predetermined, constant rate of the granular material from the cartridge.

18. A mobile device for spreading, over terrain or other surface, granular product applications contained in a cartridge, the mobile device comprising:
a granular product launcher;
a cartridge station comprising:
at least one cartridge engager comprising a locking mechanism that is configured to stabilize the cartridge after engagement with the cartridge station through engagement with complementary locking structures on a cartridge fitment when in a first position, the locking mechanism being further configured to release the cartridge in a second position and wherein further the locking mechanism is configured to be actuated a plurality of times between the first and second positions,
wherein the cartridge is removable from the at least one cartridge engager and the cartridge comprises a container, functionally joined to the cartridge fitment, for holding the granular product;
a cartridge activator, configured to activate and deactivate the flow of granular product out of a cartridge, comprising a slide engaging abutment configured to shift about a slide activation channel that is configured to mate with a complementary structure located on the cartridge fitment; and
an activation controller configured to control the cartridge activator and thereby control the activation and deactivation of an engaged cartridge.

\* \* \* \* \*